US008998729B2

(12) United States Patent
Ooba

(10) Patent No.: US 8,998,729 B2
(45) Date of Patent: Apr. 7, 2015

(54) FIXED-TYPE CONSTANT VELOCITY UNIVERSAL JOINT

(75) Inventor: Hirokazu Ooba, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/805,386

(22) PCT Filed: Jun. 13, 2011

(86) PCT No.: PCT/JP2011/063489
§ 371 (c)(1),
(2), (4) Date: Dec. 19, 2012

(87) PCT Pub. No.: WO2012/005087
PCT Pub. Date: Jan. 12, 2012

(65) Prior Publication Data
US 2013/0102397 A1    Apr. 25, 2013

(30) Foreign Application Priority Data

Jul. 8, 2010    (JP) ................................. 2010-155863

(51) Int. Cl.
*F16D 3/223*    (2011.01)
*F16C 1/04*    (2006.01)
*F16D 3/2233*    (2011.01)

(52) U.S. Cl.
CPC ............... *F16C 1/04* (2013.01); *F16D 3/2233* (2013.01); *Y10S 464/906* (2013.01)

(58) Field of Classification Search
USPC .................................................. 464/145, 906
See application file for complete search history.

(56) References Cited

U.S. PATENT DOCUMENTS

| 3,076,323 | A | * | 2/1963 | Ancktor ........................ 464/145 |
| 4,950,206 | A | | 8/1990 | Jacob |
| 6,120,382 | A | | 9/2000 | Sone et al. |
| 8,430,758 | B2 | * | 4/2013 | Schwarzler et al. .......... 464/145 |
| 2004/0137991 | A1 | | 7/2004 | Weckerling |
| 2005/0261067 | A1 | * | 11/2005 | Kobayashi et al. ........... 464/145 |

FOREIGN PATENT DOCUMENTS

| JP | 2-97718 | 4/1990 |
| JP | 10-103365 | 4/1998 |
| JP | 3111930 | 11/2000 |
| JP | 2004-169915 | 6/2004 |
| JP | 2005-308132 | 11/2005 |

(Continued)

OTHER PUBLICATIONS

International Preliminary Report on Patentability and Written Opinion of the International Searching Authority issued Feb. 21, 2013 in International (PCT) Application No. PCT/JP2011/063489.

(Continued)

*Primary Examiner* — Gregory Binda
(74) *Attorney, Agent, or Firm* — Wenderoth, Lind & Ponack, LLP

(57) ABSTRACT

A fixed type constant velocity universal joint has pairs of track grooves, each pair forming a wedge angle (α). The wedge angle (α) includes a wedge angle (α0) formed, when an operating angle is 0°, with respect to each of torque transmitting balls arranged in a joint center plane, and opening to the same side in an axial direction for all pairs of track grooves. Further, the pairs of track grooves are mirror-image symmetrical with each other when the operating angle is 0°.

20 Claims, 28 Drawing Sheets

(56) References Cited

FOREIGN PATENT DOCUMENTS

| | | |
|---|---|---|
| JP | 2007-239924 | 9/2007 |
| JP | 4401745 | 1/2010 |

OTHER PUBLICATIONS

International Search Report issued Jul. 5, 2011 in International (PCT) Application No. PCT/JP2011/063489.

* cited by examiner

Fig. 4a
Fig. 4b
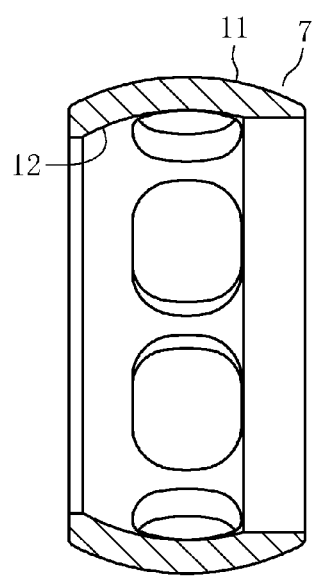
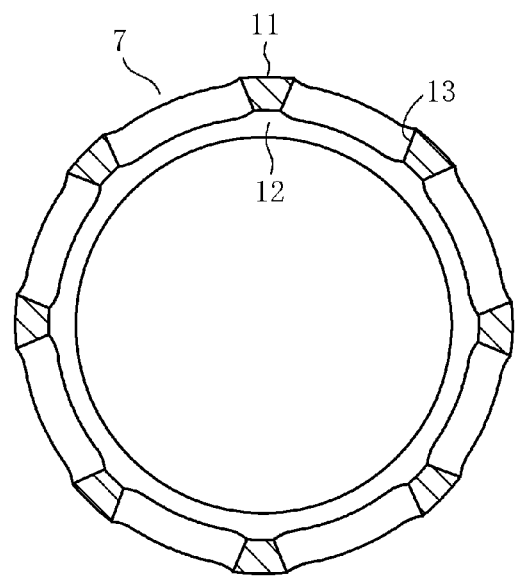

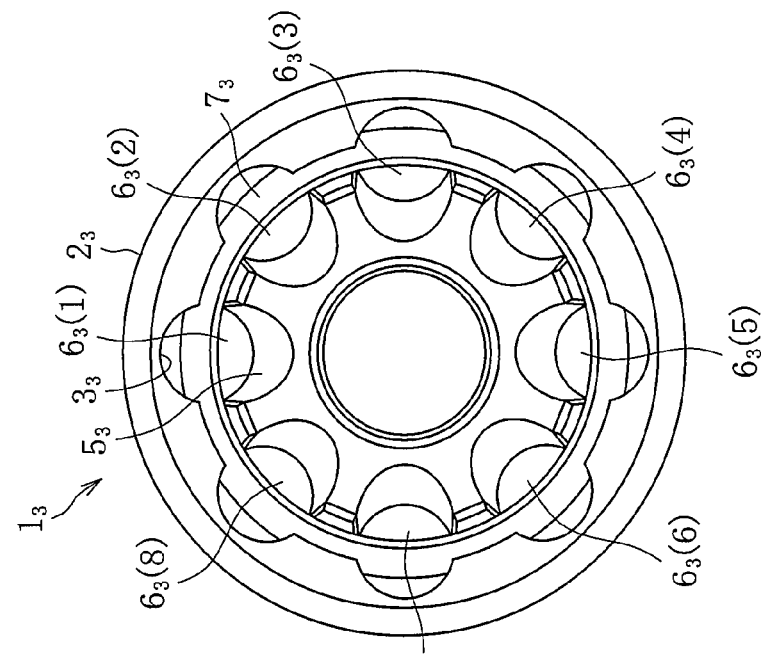
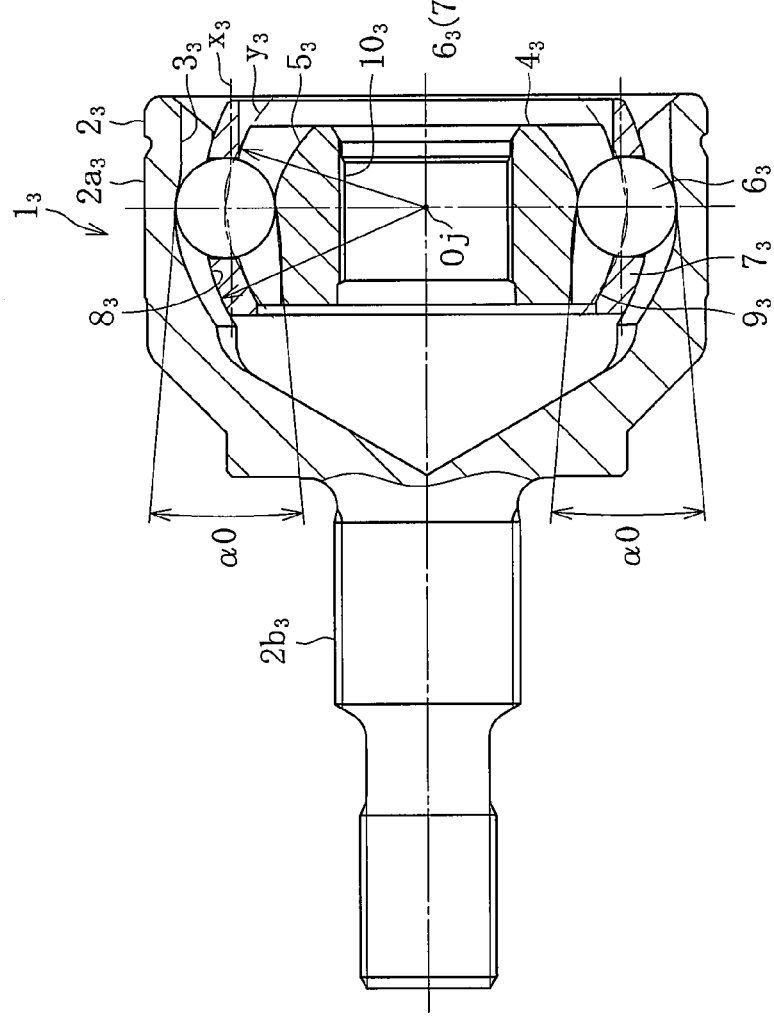
Fig. 11a
Fig. 11b

FIXED-TYPE CONSTANT VELOCITY UNIVERSAL JOINT

TECHNICAL FIELD

The present invention relates to a fixed type constant velocity universal joint, and more particularly, to a fixed type constant velocity universal joint to be used in a power transmission system for automobiles and various industrial machines, and allows only angular displacement between two shafts on a driving side and a driven side.

BACKGROUND ART

For example, in general, a plunging type constant velocity universal joint is incorporated into an inboard side (differential side) of a front drive shaft for automobiles, and a fixed type constant velocity universal joint is incorporated into an outboard side (wheel side) thereof. FIG. 23 illustrates an undercut-free type constant velocity universal joint 101 as an example of the fixed type constant velocity universal joint used on the outboard side. Track grooves 103 provided to an outer joint member 102 of the constant velocity universal joint 101 each include a circular-arc portion 103b on an inner-end side of the joint and a straight portion (a linear portion) 103a on an opening side of the joint. Track grooves 105 provided to an inner joint member 104 each include a straight portion 105a on the inner-end side of the joint and a circular-arc portion 105b on the opening side of the joint. A curvature center O1 of a part of a ball-raceway center line x, which corresponds to the circular-arc portion 103b of the track groove 103 of the outer joint member 102, is offset on a joint axial line to the opening side in an axial direction of a joint center Oj. A curvature center O2 of apart of a ball-raceway center line y, which corresponds to the circular-arc portion 105b of the track groove 105 of the inner joint member 104, is offset on the joint axial line to the inner-end side in the axial direction of the joint center Oj. Offset amounts f1 and f2 are equal to each other. Those offsets cause a wedge angle to be formed between the track groove 103 of the outer joint member 102 and the track groove 105 of the inner joint member 104, the track groove 105 facing the track groove 103. As a result, a force of holding balls 106 and a cage 107 within planes obtained by bisection of an operating angle comes into action. Normally, under a state in which the operating angle is 0°, in each of the track grooves 103 and 105, a wedge angle α0 is directed to a direction of opening to an opening side of the outer joint member 102. Normally, the ball 106 is held in contact with the track grooves 103 and 105 at a contact angle (approximately from 30° to 40°), and hence the ball 106 and the track grooves 103 and 105 are held in contact with each other actually at positions on side surface sides of the track grooves 103 and 105, which are slightly spaced apart from groove bottoms of the track grooves 103 and 105. However, for the sake of convenience in illustration, the wedge angle α0 formed between the track grooves 103 and 105 is indicated as that formed between the groove bottoms of the track grooves 103 and 105.

In this structure, each of the balls 106 receives an axial component force in accordance with the wedge angle from the track groove 103 of the outer joint member 102 and the track groove 105 of the inner joint member 104. Thus, the balls 106 press the cage 107 into the opening side of the outer joint member 102. As a result, the axial component force (spherical force) comes into action in spherical fitting parts between the outer joint member 102 and the cage 107 and between the inner joint member 104 and the cage 107. The spherical force leads to heat generation of the constant velocity universal joint, which increases loss of torque-to-be-transmitted.

As a constant velocity universal joint for solving the above-mentioned problem, in a constant velocity universal joint described in JP 3111930 B (Patent Literature 1), track grooves, which form wedge angles opening to opposite sides in the axial direction, are used instead of the above-mentioned plurality of track grooves. This constant velocity universal joint is referred to as counter track type. Description is made of this constant velocity universal joint with reference to FIG. 24.

As illustrated in FIG. 24, a constant velocity universal joint 121 includes an outer joint member 122, an inner joint member 124, balls 126, and a cage 127. A first track groove 123 provided to the outer joint member 122 is formed into a circular-arc shape along an axial direction, and a ball-raceway center line x1 of the first track groove 123 has the curvature center O1. A first track groove 125 provided to the inner joint member 124 is formed into a circular-arc shape along the axial direction, and a ball-raceway center line y1 of the first track groove 125 has the curvature center O2. The curvature center O1 of the ball-raceway center line x1 of the first track groove 123 of the outer joint member 122 is offset to the opening side with respect to the joint center Oj, and the curvature center O2 of the ball-raceway center line y1 of the first track groove 125 of the inner joint member 124 is offset to the inner-end side with respect to the joint center Oj. Those offset amounts are equal to each other. The first track groove 123 of the outer joint member 122 and the first track groove 125 of the inner joint member 124 form a first pair, and the wedge angle α0, which is formed between the first track grooves 123 and 125 under the state in which the operating angle is 0°, opens to the opening side.

Meanwhile, a second track groove 128 provided to the outer joint member 122 is formed into a circular-arc shape along the axial direction, and a ball-raceway center line x2 has the curvature center O2. A second track groove 129 provided to the inner joint member 124 is formed into a circular-arc shape along the axial direction, and a ball-raceway center line y2 has the curvature center O1. The curvature center O2 of the ball-raceway center line x2 of the second track groove 128 of the outer joint member 122 is offset to the inner-end side with respect to the joint center Oj, and the curvature center O1 of the ball-raceway center line y2 of the second track groove 129 of the inner joint member 124 is offset to the opening side with respect to the joint center Oj. Those offset amounts are equal to each other. The second track groove 128 of the outer joint member 122 and the second track groove 129 of the inner joint member 124 form a second pair, and a wedge angle 130, which is formed between the second track grooves 128 and 129 under the state in which the operating angle is 0°, opens to the inner-end side.

The constant velocity universal joint 121 is structured as described above, and hence axial component forces to act on the balls are counterbalanced. As a result, contact pressures at spherical fitting portions can be reduced, which enables reduction of loss of torque-to-be-transmitted. However, in this constant velocity universal joint, the outer joint member 122 includes the second track groove 128 which forms the wedge angle opening to the opposite side in the axial direction, specifically, opening to the inner-end side. Thus, at a high operating angle, the ball drops from the track groove, and hence it is difficult to form high operating angles.

Further, as disclosed in JP 4401745 B (Patent Literature 2), there has also been proposed a constant velocity universal joint in which the track grooves, which form the wedge angles opening to the opposite sides in the axial direction, are used instead of the above-mentioned plurality of track grooves, and in which an end portion on the opening side of each of the track grooves of the outer joint member includes a circular arc having a center on an outside of the outer joint member so that high operating angles are formed. Description is made of this constant velocity universal joint with reference to FIG. 25.

As illustrated in FIG. 25, a constant velocity universal joint 141 includes an outer joint member 142, an inner joint member 144, balls 146, and a cage 147. A first track groove 143 provided to the outer joint member 142 includes a circular-arc portion 143b formed along a spherical portion in the axial direction and a circular-arc portion 143a formed at an end portion on the opening side and curved to an opposite side with respect to the circular-arc portion 143b, the circular-arc portions 143b and 143a being continuous with each other. A region of the ball-raceway center line x1, which corresponds to the circular-arc portion 143b of the first track groove 143, has the curvature center O1, and a region of the ball-raceway center line x1, which corresponds to the circular-arc portion 143a, has a curvature center O3, the curvature center O3 being positioned on an outside in a radial direction of the outer joint member 142. The curvature centers O1 and O3 are each offset to the opening side in the axial direction with respect to the joint center Oj. A first track groove 145 provided to the inner joint member 144 includes a circular-arc portion 145a curved to an opposite side with respect to a circular-arc portion 145b. Although a ball-raceway center line of the first track groove 145 of the inner joint member 144 is not shown, the first track groove 145 of the inner joint member 144 is formed into a shape which is mirror-image symmetrical with the first track groove 143 of the outer joint member 142 with respect to a joint center plane P under the state in which the operation angle is 0°. As illustrated in FIG. 25, the first track groove 143 of the outer joint member 142 and the first track groove 145 of the inner joint member 144 form a first pair, and the wedge angle α0, which is formed between the first track grooves 143 and 145 under the state in which the operating angle is 0°, opens to the opening side.

Meanwhile, a second track groove 148 provided to the outer joint member 142 includes a circular-arc portion 148b formed along a spherical portion in the axial direction and a circular-arc portion 148a formed at the end portion on the opening side and curved to an opposite side with respect to the circular-arc portion 148b, the circular-arc portions 148b and 148a being continuous with each other. A region of the ball-raceway center line x2, which corresponds to the circular-arc portion 148b of the second track groove 148, has the curvature center O2, and a region of the ball-raceway center line x2, which corresponds to the circular-arc portion 148a, has a curvature center O4, the curvature center O4 being positioned on the outside in the radial direction of the outer joint member 142. The curvature center O2 is offset to the inner-end side in the axial direction with respect to the joint center Oj, and the curvature center O4 is offset to the opening side in the axial direction with respect to the joint center Oj. A second track groove 149 provided to the inner joint member 144 includes a circular-arc portion 149a curved to an opposite side with respect to a circular-arc portion 149b. Although a ball-raceway center line of the second track groove 149 of the inner joint member 144 is not shown, the second track groove 149 of the inner joint member 144 is formed into a shape which is mirror-image symmetrical with the second track groove 148 of the outer joint member 142 with respect to the joint center plane P under the state in which the operation angle is 0°. As illustrated in FIG. 25, the second track groove 148 of the outer joint member 142 and the second track groove 149 of the inner joint member 144 form a second pair, and the wedge angle 130, which is formed between the second track grooves 148 and 149 under the state in which the operating angle is 0°, opens to the inner-end side. In this constant velocity universal joint 141, at the end portion on the opening side, the first track groove 143 and the second track groove 148 of the outer joint member 142 include circular arcs respectively having the curvature centers O3 and O4 on the outside in the radial direction of the outer joint member 142. Thus, the balls do not drop off from the track grooves, and high operating angles can be formed.

CITATION LIST

Patent Literature 1: JP 3111930 B
Patent Literature 2: JP 4401745 B

SUMMARY OF INVENTION

Technical Problems

However, in the structure disclosed in Patent Literature 1, the second track groove 128, along which the ball-raceway center line of the track groove is largely deformed inward in the radial direction of the joint, exists at the end portion on the opening side of the outer joint member 122. Thus, at a high operating angle, the torque transmitting ball is liable to drop off from the track groove 128, and hence it is difficult to form high operating angles. Therefore, in many cases, this constant velocity universal joint 121 has been used for propeller shafts or the like, in which high operating angles need not be formed.

Meanwhile, in the structure disclosed in Patent Literature 2, although high operating angles themselves can be formed, the wedge angle becomes higher at the high operating angles, and hence load which acts from the balls 146 to the cage 147 becomes higher. Thus, there is such a risk that strength of the cage 147 is insufficient, which is an obstacle to downsizing of the joint. Further, owing to the track groove shapes of the two types, manufacturability may be deteriorated, and dimensional management at the time of manufacture may be complicated.

In view of the above-mentioned problems, it is an object of the present invention to provide a highly efficient fixed type constant velocity universal joint which involves less torque loss and is easy to manufacture.

Further, it is also an object of the present invention to provide a compact fixed type constant velocity universal joint which is capable of forming high operating angles and excellent in strength and durability at the high operating angles.

Solution to Problems

Through various studies for achieving the above-mentioned objects, the inventor of the present invention has conceived an innovative fixed type constant velocity universal joint in which, although all track grooves of an outer joint member and track grooves of an inner joint member are formed into the same shape, the track grooves of the outer joint member and the track grooves of the inner joint member cause pocket loads to be generated from balls to act onto a cage in a counterbalancing direction at an operating angle, to thereby reduce torque loss.

In order to achieve the above-mentioned objects, according to the present invention, there is provided a fixed type constant velocity universal joint, comprising: an outer joint member having a spherical inner peripheral surface provided with a plurality of track grooves extending in an axial direction, and having an opening side and an inner-end side spaced apart from each other in the axial direction; an inner joint member having a spherical outer peripheral surface provided with a plurality of track grooves extending in the axial direction; torque transmitting balls arranged respectively between pairs of the plurality of track grooves of the outer joint member and the plurality of track grooves of the inner joint member; and a cage for holding the torque transmitting balls, the cage spherically fitting to both the spherical inner peripheral surface of the outer joint member and the spherical outer peripheral surface of the inner joint member, wherein the pairs of the plurality of track grooves of the outer joint member and the plurality of track grooves of the inner joint member each form a wedge angle ($\alpha$), the wedge angle ($\alpha$) comprising a wedge angle ($\alpha 0$) formed, under a state in which an operating angle is 0°, with respect to each of the torque transmitting balls arranged in a joint center plane, and opening to the same side in the axial direction in all the pairs of the plurality of track grooves of the outer joint member and the plurality of track grooves of the inner joint member, and wherein the pairs of the plurality of track grooves of the outer joint member and the plurality of track grooves of the inner joint member are each formed into a shape which is mirror-image symmetrical with each other with respect to the joint center plane under the state in which the operating angle is 0°, the shape of each of the pairs of the plurality of track grooves of the outer joint member and the plurality of track grooves of the inner joint member being defined in the axial direction so that, at an operating angle formed by the fixed type constant velocity universal joint, the wedge angle ($\alpha$) reaches 0° first on the opening side in accordance with movement of the torque transmitting balls to the opening side of the outer joint member, and then, the wedge angle ($\alpha$) is directed to a direction opposite to a direction in which the wedge angle ($\alpha 0$) opens, and reversely, the wedge angle ($\alpha$) reaches 0° first on the inner-end side in accordance with movement of the torque transmitting balls to the inner-end side of the outer joint member, and then, the wedge angle ($\alpha$) is directed to the direction opposite to the direction in which the wedge angle ($\alpha 0$) opens. Further, in addition to the above-mentioned feature, an operating angle ($\theta 1$) at which the wedge angle ($\alpha$) reaches 0° first on the opening side and an operating angle ($\theta 2$) at which the wedge angle ($\alpha$) reaches 0° first on the inner-end side are different from each other.

With the structure described above, at a time of a rotational operation at a certain operating angle or higher, the pocket loads are generated from the torque transmitting balls to act onto the cage in the counterbalancing direction, with the result that a spherical load between the outer joint member and the cage and a spherical load between the inner joint member and the cage are reduced. Thus, torque loss is reduced, and efficiency of the fixed type constant velocity universal joint is enhanced. Further, the low spherical loads prevent a spherical center of the cage from being displaced from the joint center, and reduce variation in track load during one rotation at an operating angle, with the result that peak loads are reduced. Further, in terms of manufacture, all the plurality of track grooves of the outer joint member and the plurality of track grooves of the inner joint member are formed into the same shape, and hence can be easily manufactured. In addition, dimensional management can be facilitated, and dimensional accuracy can be enhanced.

The plurality of track grooves of the outer joint member and the plurality of track grooves of the inner joint member each comprise two or three curves continuous with each other in the axial direction. With this structure, even at high operating angles, a sufficient depth of each of the plurality of track grooves of the outer joint member and the plurality of track grooves of the inner joint member can be secured. As a result, a fixed type constant velocity universal joint, which is lightweight, compact, and excellent in strength and durability at high operating angles, can be provided.

The plurality of curves continuous with each other in the axial direction of each of the plurality of track grooves of the outer joint member and the plurality of track grooves of the inner joint member each comprise a circular arc. With this structure, the fixed type constant velocity universal joint can be manufactured by widely used processing techniques such as a grinding process and a quenched-steel trimming process.

The plurality of track grooves of the outer joint member, which comprise the circular arc, each comprise a ball-raceway center line corresponding, from the inner-end side to the opening side, to two circular-arc track groove portions, that is, a track groove portion 3$b$ comprising a circular arc having a radius R2 with respect to a curvature center O2 and a track groove portion 3$a$ comprising a circular arc having a radius R1 with respect to a curvature center O1, and the plurality of track grooves of the inner joint member are each formed into a shape which is mirror-image symmetrical respectively with the plurality of track grooves of the outer joint member with respect to the joint center plane under the state in which the operating angle is 0°. Further, the plurality of track grooves of the outer joint member, which comprise the circular arc, each comprise a ball-raceway center line corresponding, from the inner-end side to the opening side, to three circular-arc track groove portions, that is, a track groove portion 3$c$ comprising a circular arc having a radius R3 with respect to a curvature center O3, a track groove portion 3$b$ comprising a circular arc having a radius R2 with respect to a curvature center O2, and a track groove portion 3$a$ comprising a circular arc having a radius R1 with respect to a curvature center O1, and the plurality of track grooves of the inner joint member are each formed into a shape which is mirror-image symmetrical respectively with the plurality of track grooves of the outer joint member with respect to the joint center plane under the state in which the operating angle is 0°. With this structure, even at high operating angles, a sufficient depth of each of the plurality of track grooves of the outer joint member and the plurality of track grooves of the inner joint member can be secured. As a result, a fixed type constant velocity universal joint, which is lightweight, compact, and excellent in strength and durability at high operating angles, can be manufactured by the widely used processing techniques such as the grinding process and the quenched-steel trimming process.

A linear track groove portion extending parallel to an axial line of the fixed type constant velocity universal joint is formed at an opening end portion of each of the plurality of track grooves of the outer joint member and an end portion on the inner-end side of each of the plurality of track grooves of the inner joint member. Through management of the linear track groove portions thus formed, dimensional management of the joint member as a whole can be facilitated.

The operating angle $\theta 1$ at which the wedge angle $\alpha$ reaches 0° first on the opening side of the outer joint member or, as illustrated in FIG. 28, the operating angle $\theta 2$ at which the wedge angle $\alpha$ reaches 0° first on the inner-end side of the outer joint member is set to 15°. The operating angle $\theta 1$ or the operating angle $\theta 2$ can be appropriately designed in consideration of a normal angle of a type of a vehicle in which the fixed type constant velocity universal joint is used. However, when the above-mentioned operating angle $\theta 1$ or the above-mentioned operating angle θ2 is set to 15°, the fixed type constant velocity universal joint can be widely used for various vehicle types.

The number of the torque transmitting balls is not particularly limited, but when six torque transmitting balls are employed, it is suitable to design for joints of small sizes, and when eight torque transmitting balls are employed, it is optimum to reduction of the torque loss.

The fixed type constant velocity universal joint according to the present invention is suitable to a drive shaft and a propeller shaft.

Advantageous Effects of Invention

As described above, according to the present invention, it is possible to manufacture at low cost the highly efficient fixed type constant velocity universal joint which involves less torque loss. Further, the fixed type constant velocity universal joint, which is lightweight, compact, capable of easily forming high operating angles, and excellent in strength and durability at the high operating angles, can be provided.

BRIEF DESCRIPTION OF DRAWINGS

FIG. 4a A vertical sectional view of a cage.

FIG. 4b A horizontal sectional view of the cage.

FIG. 11a A vertical sectional view of a fixed type constant velocity universal joint according to a fourth embodiment of the present invention.

FIG. 11b A front view of the fixed type constant velocity universal joint according to the fourth embodiment of the present invention.

DESCRIPTION OF EMBODIMENTS

In the following, description is made of embodiments of the present invention with reference to FIGS. 1a to 22b.

Figure 1B:
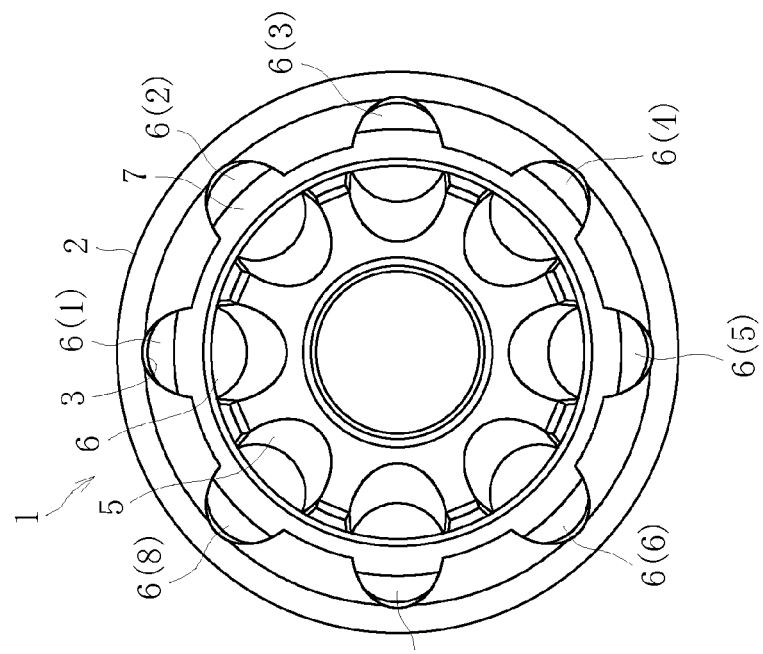
FIG. 1b A front view of the fixed type constant velocity universal joint according to the first embodiment of the present invention.
Figure 1A:
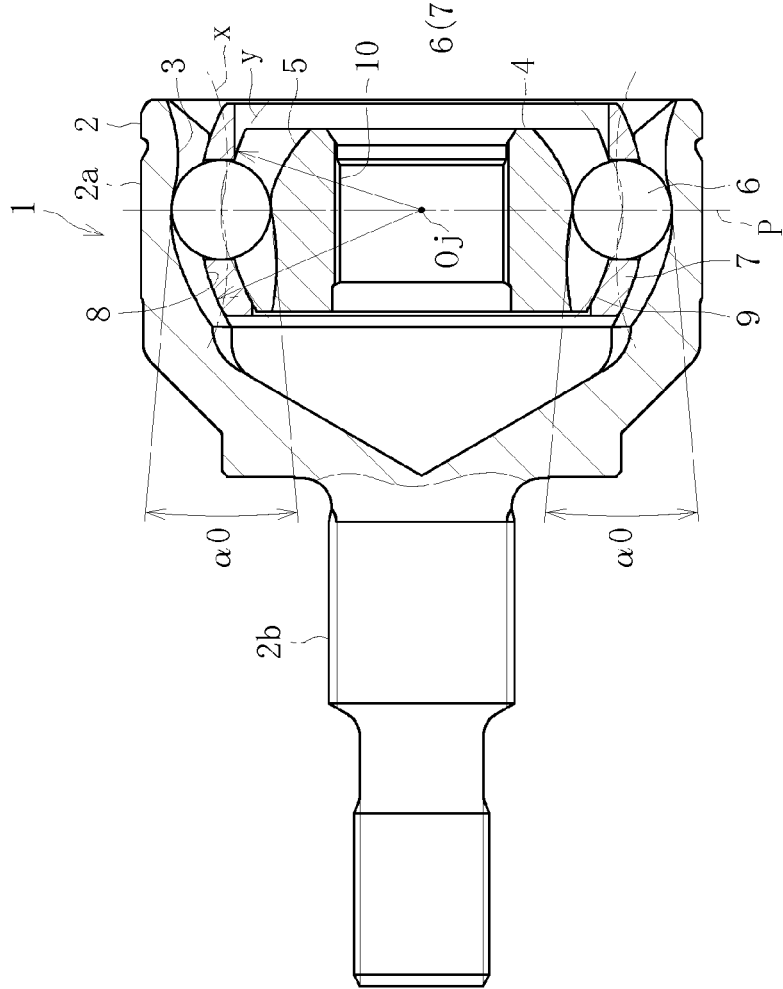
FIG. 1a A vertical sectional view of a fixed type constant velocity universal joint according to a first embodiment of the present invention.

FIGS. 1a to 8 illustrate a first embodiment of the present invention. FIGS. 1a and b illustrate an entire fixed type constant velocity universal joint 1 according to the first embodiment. FIG. 1a is a vertical sectional view of the fixed type constant velocity universal joint 1, and FIG. 1b is a front view thereof. The fixed type constant velocity universal joint 1 comprises an outer joint member 2, an inner joint member 4, balls 6, and a cage 7. In a spherical inner peripheral surface 8 of the outer joint member 2, eight track grooves 3 are formed equiangularly along an axial direction. In a spherical outer peripheral surface 9 of the inner joint member 4, eight track grooves 5 facing the track grooves 3 of the outer joint member 2 are formed equiangularly along the axial direction. Between the track grooves 3 of the outer joint member 2 and the track grooves 5 of the inner joint member 4, eight balls 6 for transmitting torque are interposed. Between the spherical inner peripheral surface 8 of the outer joint member 2 and the spherical outer peripheral surface 9 of the inner joint member 4, the cage 7 for holding the balls 6 is arranged. The outer joint member 2 comprises a mouth portion 2a and a stem portion 2b provided integrally with each other. The inner joint member 4 comprises a spline hole 10 provided along an inner periphery thereof so as to be spline-coupled to a shaft (not shown). An outer peripheral surface of the outer joint member 2 and an outer peripheral surface of the shaft are covered with a boot (not shown), and grease as lubricant is sealed inside the joint.

Curvature centers of the spherical inner peripheral surface 8 of the outer joint member 2 and the spherical outer peripheral surface 9 of the inner joint member 4 each match with a joint center Oj. A ball-raceway center line x of the track groove 3 of the outer joint member 2 and a ball-raceway center line y of the track groove 5 of the inner joint member 4 are each indicated by a dashed line. Detailed description thereof is made with reference to FIGS. 2 and 3.

Figure 2:
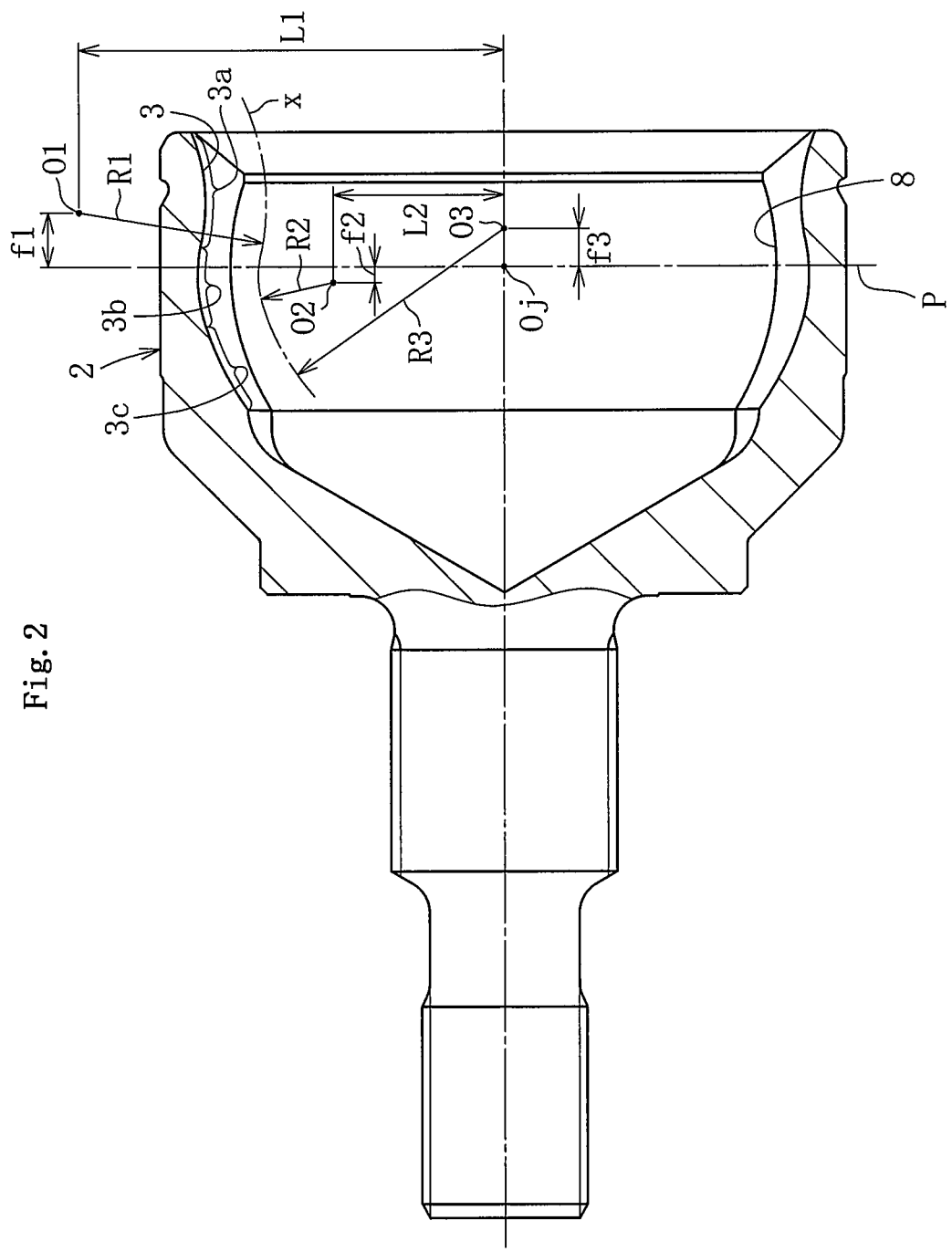
FIG. 2 A vertical sectional view of an outer joint member of the above-mentioned fixed type constant velocity universal joint.

In FIG. 2, the ball-raceway center line x of the track groove 3 of the outer joint member 2 of the fixed type constant velocity universal joint 1 according to this embodiment is indicated. The ball-raceway center line x extends along a track groove portion 3b in a region comprising a joint center plane P under a state in which an operating angle is 0°, a track groove portion 3a on an opening side, and a track groove portion 3c on an inner-end side, and the track groove portions 3a, 3b, and 3c respectively comprise three different curves. The track groove portions 3a, 3b, and 3c respectively comprising the three different curves are smoothly continuous with each other. A part of the ball-raceway center line x, which corresponds to the track groove portion 3a on the opening side, comprises a circular arc having a radius R1 with respect to a curvature center O1. The curvature center O1 is offset, with respect to the joint center Oj, by an offset amount f1 to the opening side in the axial direction, and by a radial offset amount L1 in a radial direction from a joint axial line. The curvature center O1 is positioned on an outer side with respect to an outer diameter of the outer joint member 2. A part of the ball-raceway center line x, which corresponds to the track groove portion 3b in the region comprising the joint center plane P under the state in which the operating angle is 0°, comprises a circular arc having a small radius R2 with respect to a curvature center O2. The curvature center O2 is offset, with respect to the joint center Oj, by an offset amount f2 to the inner-end side in the axial direction, and by a radial offset amount L2 in the radial direction from the joint axial line in a manner that a diameter of the circular arc is reduced. A part of the ball-raceway center line x, which corresponds to the track groove portion 3c on the inner-end side, comprises a circular arc having a relatively large radius R3 with respect to a curvature center O3. The curvature center O3 is offset, with respect to the joint center Oj, by an offset amount f3 to the opening side in the axial direction, and positioned on the joint axial line without being offset in the radial direction. The parts of the ball-raceway center line x, which correspond respectively to the track groove portions 3a, 3b, and 3c respectively having the three curvature radii R1, R2, and R3, are smoothly continuous with each other.

Figure 3A:
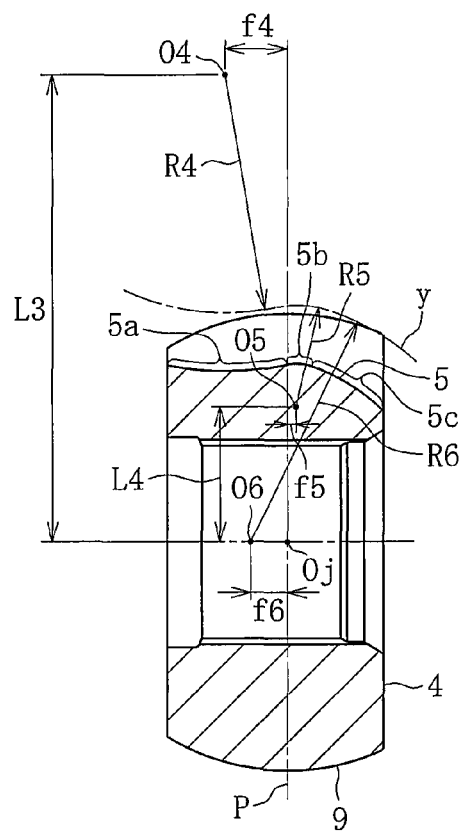
FIG. 3a A vertical sectional view of an inner joint member.
Figure 3B:
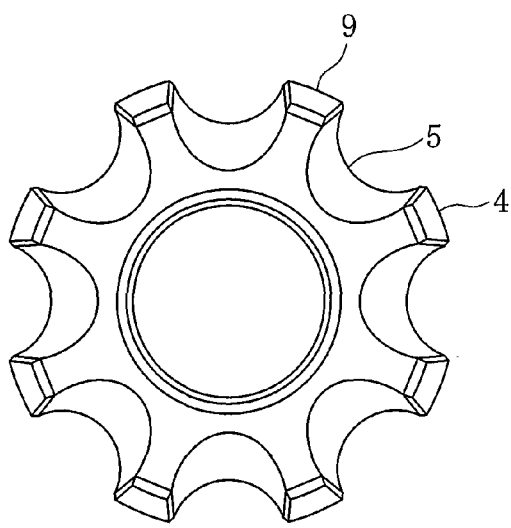
FIG. 3b A front view of the inner joint member.

FIGS. 3a and b illustrate the inner joint member 4. FIG. 3a is a vertical sectional view of the inner joint member 4, and FIG. 3b is a front view of the inner joint member 4. As illustrated in FIG. 3a, the ball-raceway center line y extends along the track groove 5 of the inner joint member 4. Under the state in which the operating angle is 0°, the track groove 5 of the inner joint member 4 is formed into a shape which is mirror-image symmetrical with the track groove 3 of the outer joint member 2 as a counterpart with respect to the joint center plane P. The ball-raceway center line y of the track groove 5 of the inner joint member 4 extends along a track groove portion 5b in the region comprising the joint center plane P under the state in which an operating angle is 0°, a track groove portion 5c on the opening side, and a track groove portion 5a on the inner-end side, and the track groove portions 5a, 5b, and 5c respectively comprise three different curves. The track groove portions 5a, 5b, and 5c respectively comprising the three different curves are smoothly continuous with each other. A part of the ball-raceway center line y, which corresponds to the track groove portion 5a on the inner-end side, comprises a circular arc having a radius R4 with respect to a curvature center O4. The curvature center O4 is offset, with respect to the joint center Oj, by an offset amount f4 to the inner-end side in the axial direction, and by a radial offset amount L3 in the radial direction from the joint axial line. The curvature center O4 is positioned on an outer side with respect to an outer diameter of the inner joint member 4. A part of the ball-raceway center line y, which corresponds to the track groove portion 5b in the region comprising the joint center plane P under the state in which the operating angle is 0°, comprises a circular arc having a small radius R5 with respect to a curvature center O5. The curvature center O5 is offset, with respect to the joint center Oj, by an offset amount f5 to the opening side in the axial direction, and by a radial offset amount L4 in the radial direction from the joint axial line. A part of the ball-raceway center line y, which corresponds to the track groove portion 5c on the opening side, comprises a circular arc having a relatively large radius R6 with respect to a curvature center O6. The curvature center O6 is offset, with respect to the joint center Oj, by an offset amount f6 to the inner-end side in the axial direction, and positioned on the joint axial line without being offset in the radial direction. The parts of the ball-raceway center line y, which correspond respectively to the track groove portions 5a, 5b, and 5c respectively having the three curvature radii R4, R5, and R6, are smoothly continuous with each other. Further, the offset amounts f4, f5, and f6, the radial offset amounts L3 and L4, and the curvature radii R4, R5, and R6 are set to correspond respectively to the offset amounts f1, f2, and f3, the radial offset amounts L1 and L2, and the curvature radii R1, R2, and R3 of the outer joint member 2 of FIG. 2.

In the fixed type constant velocity universal joint 1 according to this embodiment, the outer joint member 2 comprises the three circular-arc track groove portions 3a, 3b, and 3c, and the track groove 5 of the inner joint member 4 is formed into the shape which is mirror-image symmetrical with the track groove 3 of the outer joint member 2 with respect to the joint center plane P under the state in which the operating angle is 0°. Those three circular-arc track groove portions enable the track groove to reliably have a sufficient depth even at high operating angles. As a result, a fixed type constant velocity universal joint, which is lightweight, compact, and excellent in strength and durability at high operating angles, can be manufactured by widely used processing techniques such as a grinding process and a quenched-steel trimming process.

The ball-raceway center line x of the track groove 3 of the outer joint member 2 and the ball-raceway center line y of the track groove 5 of the inner joint member 4, which are indicated in FIGS. 1a to 3b, each match with a ball center trajectory to move in the track grooves 3 and 5. Normally, the ball 6 is held in contact with the track grooves 3 and 5 at a contact angle (approximately from 30° to 40°), and hence the ball 6 and the track grooves 3 and 5 are held in contact with each other actually at positions on side surface sides of the track grooves 3 and 5, which are slightly spaced apart from groove bottoms of the track grooves 3 and 5. However, for the sake of convenience in illustration, here, a wedge angle α formed between the track grooves 3 and 5 is indicated as that formed between the groove bottoms of the track grooves 3 and 5. A wedge angle under a state in which an operating angle θ is 0° is represented by α0. The wedge angle α0 is defined as a wedge angle formed between parts of the track grooves 3 and 5, at which the track grooves 3 and 5 abut against the ball 6 under a state in which all centers of the balls 6 are arranged in the joint center plane P under the state in which the operating angle θ is 0°. As illustrated in FIG. 1, in the fixed type constant velocity universal joint 1 according to this embodiment, the wedge angle α0 opens to the inner-end side of the outer joint member 2, and a direction in which the wedge angle opens in this manner is defined as a minus direction. In contrast, a direction in which the wedge angle opens to the opening side of the outer joint member 2 is defined as a plus direction.

FIGS. 4a and b illustrate the cage 7. FIG. 4a is a vertical sectional view of the cage 7, and FIG. 4b is a horizontal sectional view of the cage 7. The cage 7 has a spherical outer peripheral surface 11 and a spherical inner peripheral surface 12, and curvature centers of the spherical outer peripheral surface 11 and the spherical inner peripheral surface 12 each match with the joint center Oj. The cage 7 comprises eight pockets 13 provided in a circumferential direction, and respectively house and hold the eight balls 6 (not shown).

Figure 5:
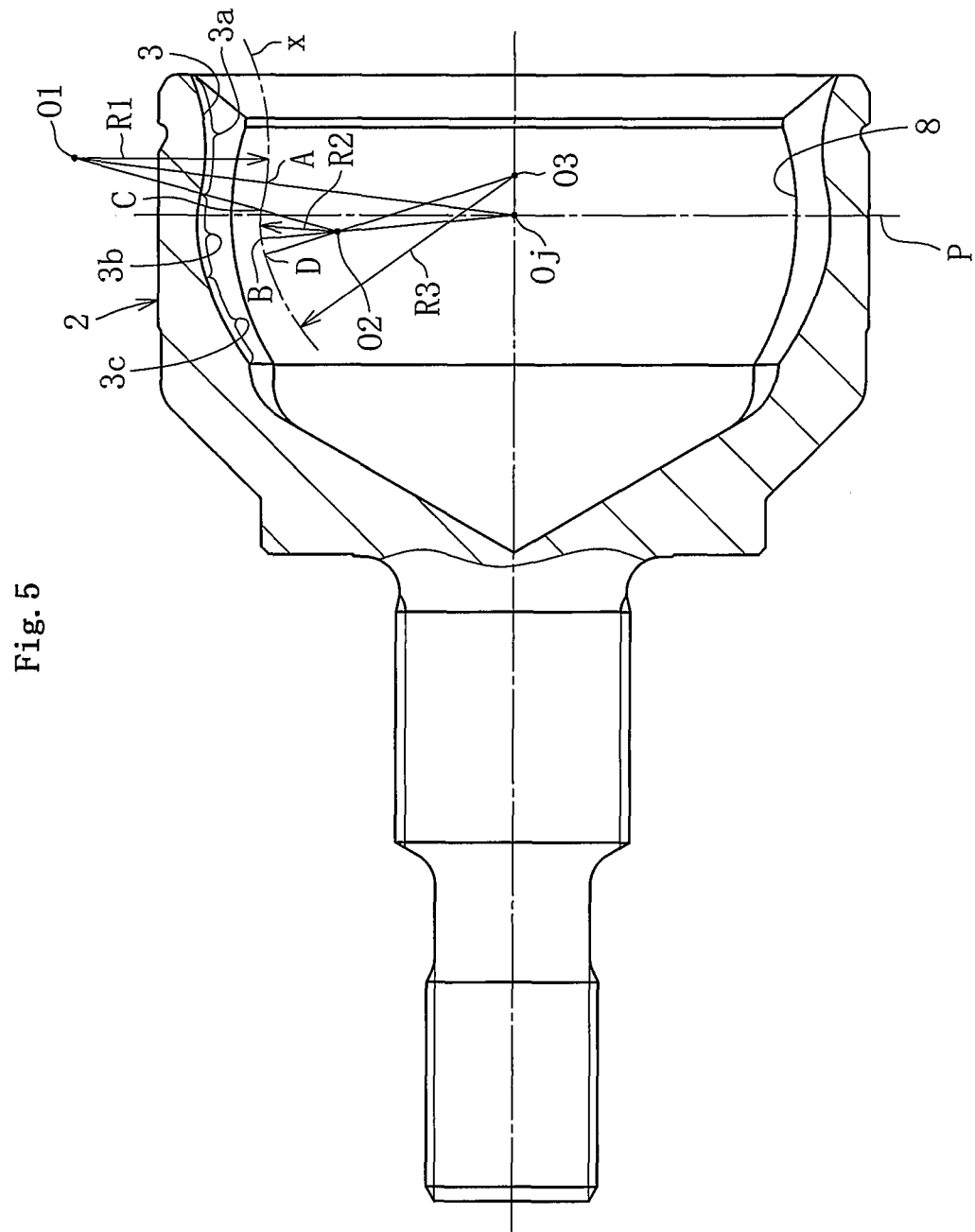
FIG. 5 A vertical sectional view of the outer joint member, for illustrating how a wedge angle is formed.
Figure 26:
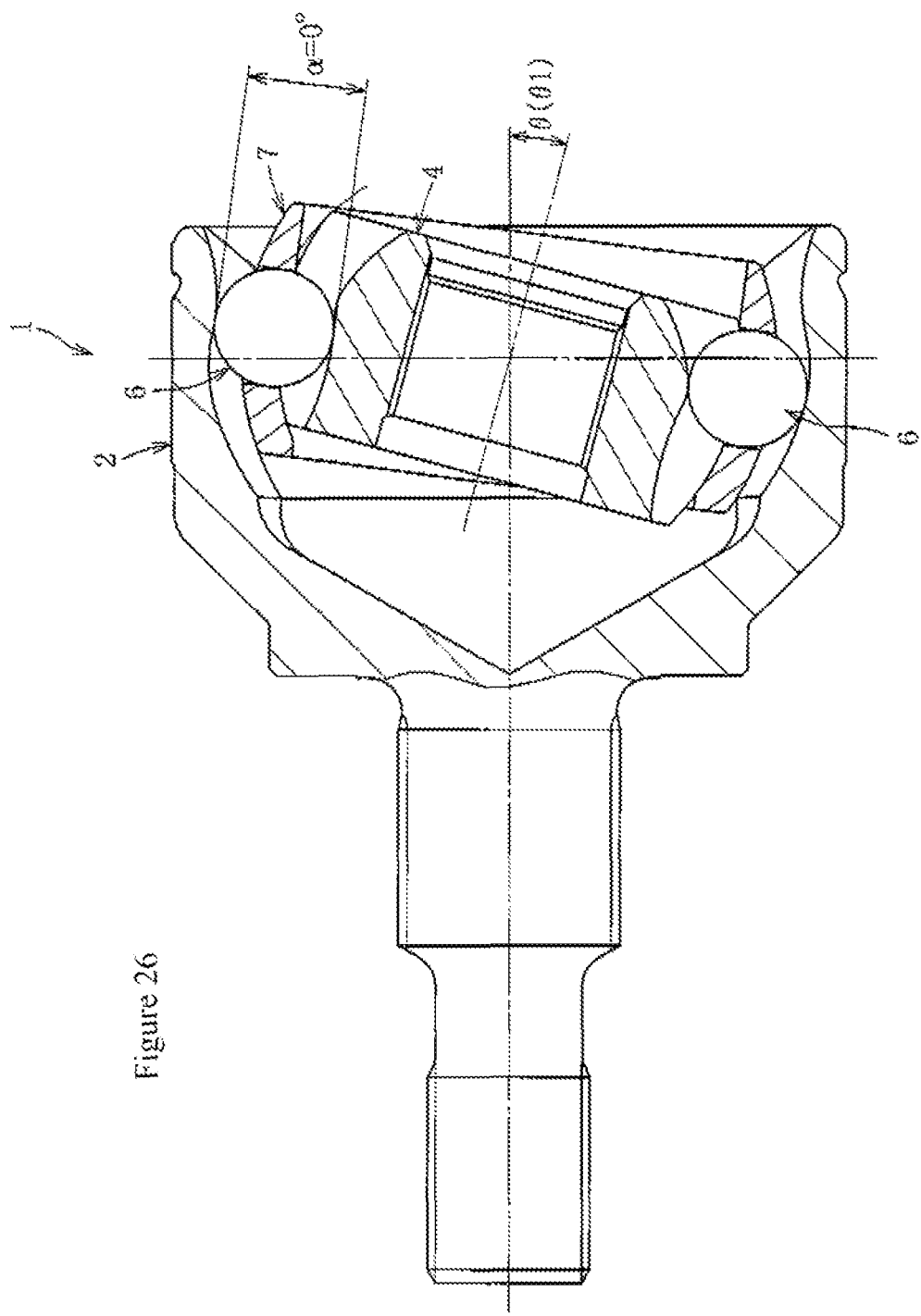
FIG. 26 A vertical sectional view of a fixed type constant velocity joint with a torque transmitting ball positioned toward an opening side and having a wedge angle α equal to 0°.

Next, description is made of how the wedge angle α formed between the track grooves 3 and 5 varies when the fixed type constant velocity universal joint 1 according to this embodiment forms an operating angle and accordingly the balls 6 move in the axial direction between the track grooves. With regard to formation of the wedge angle α between the track grooves 3 and 5, as described above, the track grooves 3 and 5 are formed to be mirror-image symmetrical with each other with respect to the joint center plane P. On this premise, in the following, description is made only of the track groove 3 of the outer joint member 2. FIG. 5 illustrates, more specifically than FIG. 2, the curvature centers O1, O2, and O3 and the curvature radii R1, R2, and R3 of the ball-raceway center line x, which correspond respectively to the track groove portions 3a, 3b, and 3c. Under the state in which the operating angle θ is 0°, the balls 6 (not shown) are positioned in the joint center plane P under the state in which the operating angle θ is 0°. The part of the ball-raceway center line x, which corresponds to the track groove portion 3b in the region comprising the joint center plane P under the state in which the operating angle θ is 0°, comprises the circular arc having the curvature radius R2 with respect to the curvature center O2. The curvature center O2 is offset to the inner-end side in the axial direction with respect to the joint center Oj. Thus, at the part of the ball-raceway center line x, which corresponds to the track groove portion 3b, the wedge angle α opens to a region on the inner-end side, in other words, the wedge angle is directed to the minus direction. The part of the ball-raceway center line x, which corresponds to the track groove portion 3a on the opening side, comprises the circular arc having the curvature radius R1 with respect to the curvature center O1. The part of the ball-raceway center line x, which corresponds to the track groove portion 3a on the opening side, and the part of the ball-raceway center line x, which corresponds to the track groove portion 3b in the region comprising the joint center plane P under the state in which the operating angle is 0°, are connected to each other at an intersection C between a straight line connecting the curvature centers O1 and O2 to each other and the ball-raceway center line x. When the joint forms the operating angle θ, the balls 6 move to the opening side of the outer joint member 2. Even after the balls 6 pass through the intersection C on the ball-raceway center line x, the wedge angle α remains directed to the minus direction for a while. Then, when the balls 6 reach an intersection A between a straight line connecting the curvature center O1 and the joint center Oj to each other and the ball-raceway center line x, the wedge angle α reaches 0°. At this position, as illustrated in FIG. 26, the wedge angle α reaches 0° first on the opening side, and an operating angle at which the balls 6 reach this position is defined as an operating angle θ1. After the balls 6 pass through the intersection A on the ball-raceway center line x, oppositely, the wedge angle α opens to a region on the opening side of the outer joint member 2, in other words, the wedge angle α is directed to the plus direction.

Figure 27:
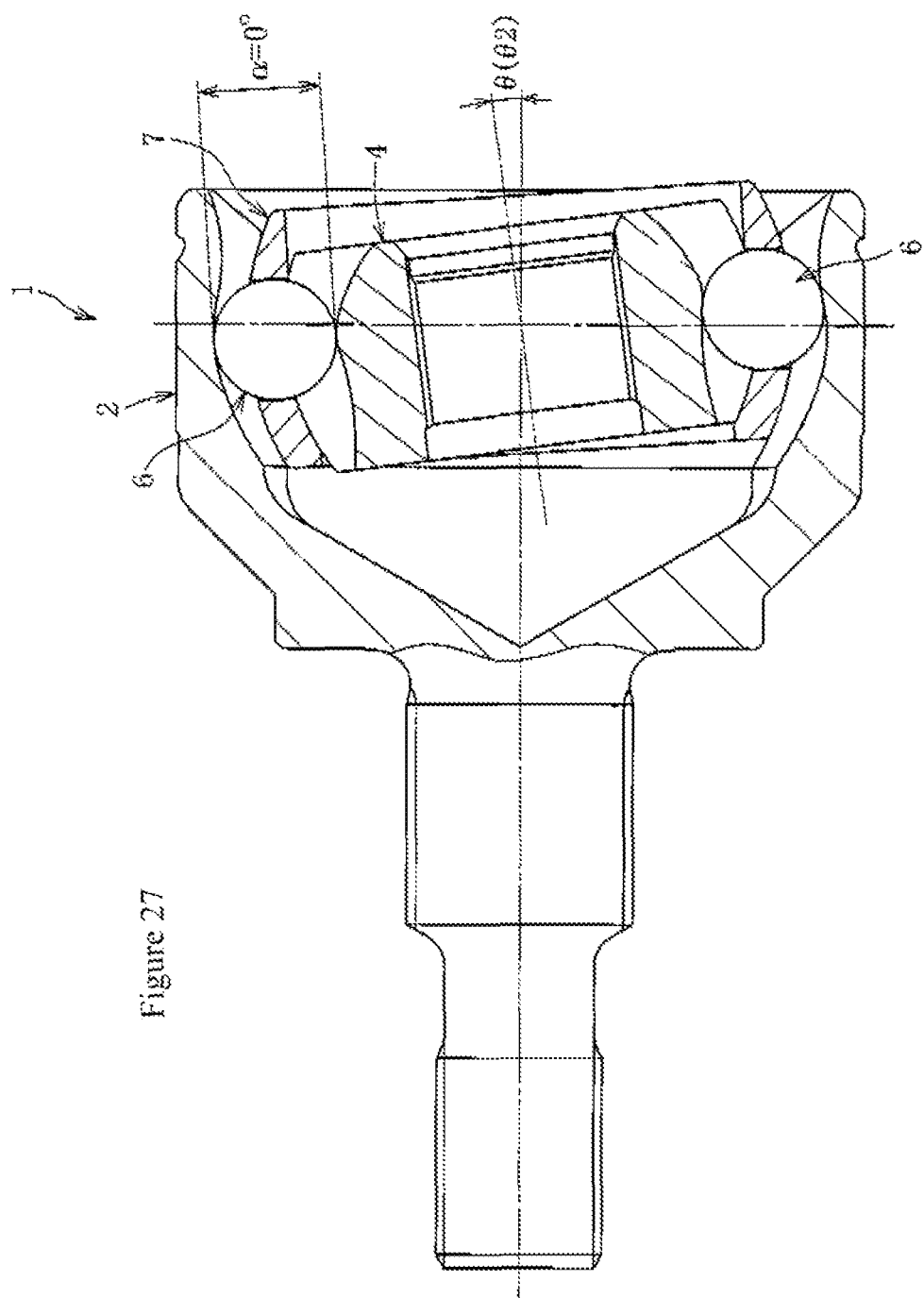
FIG. 27 A vertical sectional view of a fixed type constant velocity joint with a torque transmitting ball positioned toward an inner-end side and having a wedge angle α equal to 0°.
Figure 28:
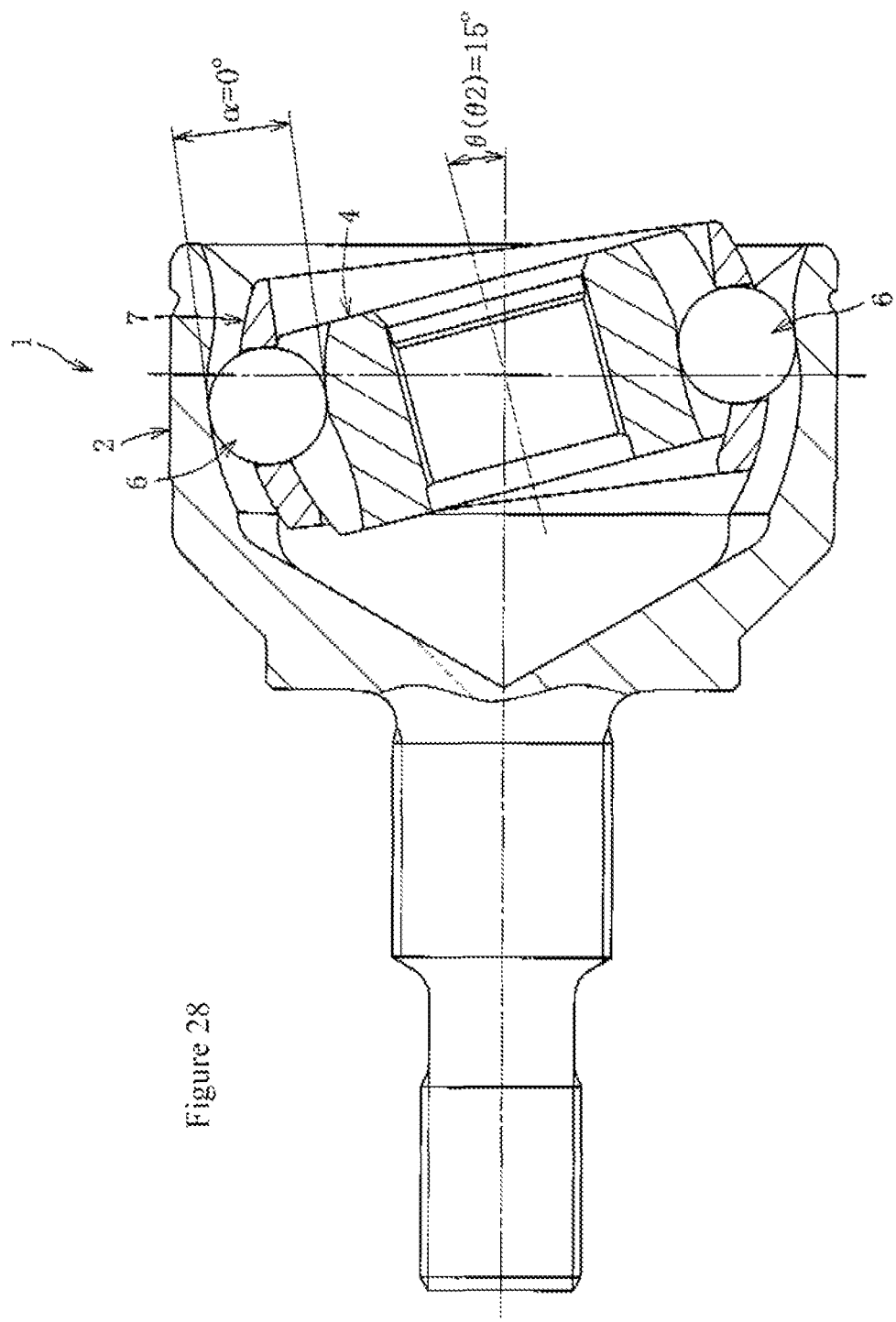
FIG. 28 A vertical sectional view of a fixed type constant velocity joint at an operating angle of 15° with a torque transmitting ball positioned toward an inner-end side and having a wedge angle α equal to 0°.

Meanwhile, the part of the ball-raceway center line x, which corresponds to the track groove portion 3c on the inner-end side, comprises the circular arc having the curvature radius R3 with respect to the curvature center O3. The part of the ball-raceway center line x, which corresponds to the track groove portion 3c on the inner-end side, and the part of the ball-raceway center line x, which corresponds to the track groove portion 3b in the region comprising the joint center plane P under the state in which the operating angle θ is 0°, are connected to each other at an intersection D between a straight line connecting the curvature centers O2 and O3 to each other and the ball-raceway center line x. Under the state in which the wedge angle α is directed to the minus direction, when the balls 6 move to the inner-end side of the outer joint member 2 and the balls 6 reach an intersection B between a straight line connecting the curvature center O2 and the joint center Oj to each other and the ball-raceway center line x, the wedge angle α reaches 0°. At this position, the wedge angle α reaches 0° first on the inner-end side, as illustrated in FIG. 27, and an operating angle at which the balls 6 reach this position is represented by θ2. After the balls 6 pass through the intersection B on the ball-raceway center line x, oppositely, the wedge angle α opens to the region on the opening side of the outer joint member 2, in other words, the wedge angle α is directed to the plus direction. Thus, in the fixed type constant velocity universal joint according to this embodiment, the wedge angle α switches in an order of the plus direction, the minus direction, and the plus direction from the inner-end side to the opening side, and the wedge angle α reaches 0° at each switching points of the direction of the wedge angle α.

When the fixed type constant velocity universal joint 1 according to this embodiment forms an operating angle, in order that the wedge angle in the plus direction and the wedge angle in the minus direction between the track grooves 3 and 5 arranged in the circumferential direction are balanced with each other in the joint as a whole, the operating angle θ1 at which the wedge angle α reaches 0° first when the balls 6 move to the opening side of the outer joint member 2 and the operating angle θ2 at which the wedge angle α reaches 0° first when the balls 6 move to the inner-end side of the outer joint member 2 are set to be different from each other. In the following, detailed description is made of this setting.

First, the operating angles θ1 and θ2 at each of which the wedge angle α reaches 0° first when the balls 6 move in the axial direction are set in consideration of a normal angle of the joint or operating angles which are higher than the normal angle and each have a relatively high frequency of use. In a case of a drive shaft of an automobile, this normal angle refers to an operating angle formed in a fixed type constant velocity universal joint of a front drive shaft of an automobile with one person on board when a steering of the automobile with one person on board is switched to a straightforward mode on a horizontal and flat road surface. Normally, the normal angle is selected and determined within a range of from 2° to 15° in accordance with design conditions for various vehicle types. The operating angles which are higher than the normal angle and each have a relatively high frequency of use do not refer to high operating angles formed, for example, in the fixed type constant velocity universal joint of the above-mentioned automobile at the time of right turning and left turning at a traffic intersection but refer to operating angles formed, for example, in the fixed type constant velocity universal joint of the above-mentioned automobile during continuous running on a curved road. This is also determined in accordance with the design conditions for various vehicle types. The operating angles which are higher than the normal angle and each have a relatively high frequency of use are aimed at approximately 20°. Meanwhile, a normal angle of a propeller shaft for automobiles is lower than that of the above-mentioned drive shaft, specifically, ranges from approximately 2° to 5°. The above-mentioned normal angle and operating angles which are higher than the normal angle and each have a relatively high frequency of use are correctively referred to as reference operating angle.

In the fixed type constant velocity universal joint 1 according to this embodiment, which is illustrated in FIG. 5, the reference operating angle is set to 15°. Based on this, the operating angle θ1 at which the wedge angle α reaches 0° first when the balls 6 move to the opening side of the outer joint member 2 is set to 15°. Meanwhile, the operating angle θ2 at which the wedge angle α reaches 0° first when the balls 6 move to the inner-end side of the outer joint member 2 is set to 7.5°, which is half of the above-mentioned operating angle θ1. Therefore, an inclination angle of the straight line of FIG. 5 connecting the point A on the ball-raceway center line x and the joint center Oj to each other reaches 7.5°, and meanwhile, an inclination angle of the straight line connecting the point B on the ball-raceway center line x and the joint center Oj reaches 3.75°.

In the fixed type constant velocity universal joint 1 according to this embodiment, as described above, the operating angle θ1 at which the wedge angle α on the opening side of the outer joint member 2 reaches 0° first is set to 15°. The operating angle θ1 may be appropriately designed in consideration of a normal angle of a type of a vehicle in which the joint is used. However, when the above-mentioned operating angle θ1 is set to 15°, the fixed type constant velocity universal joint 1 according to this embodiment can be widely used for various vehicle types.

Figure 6:
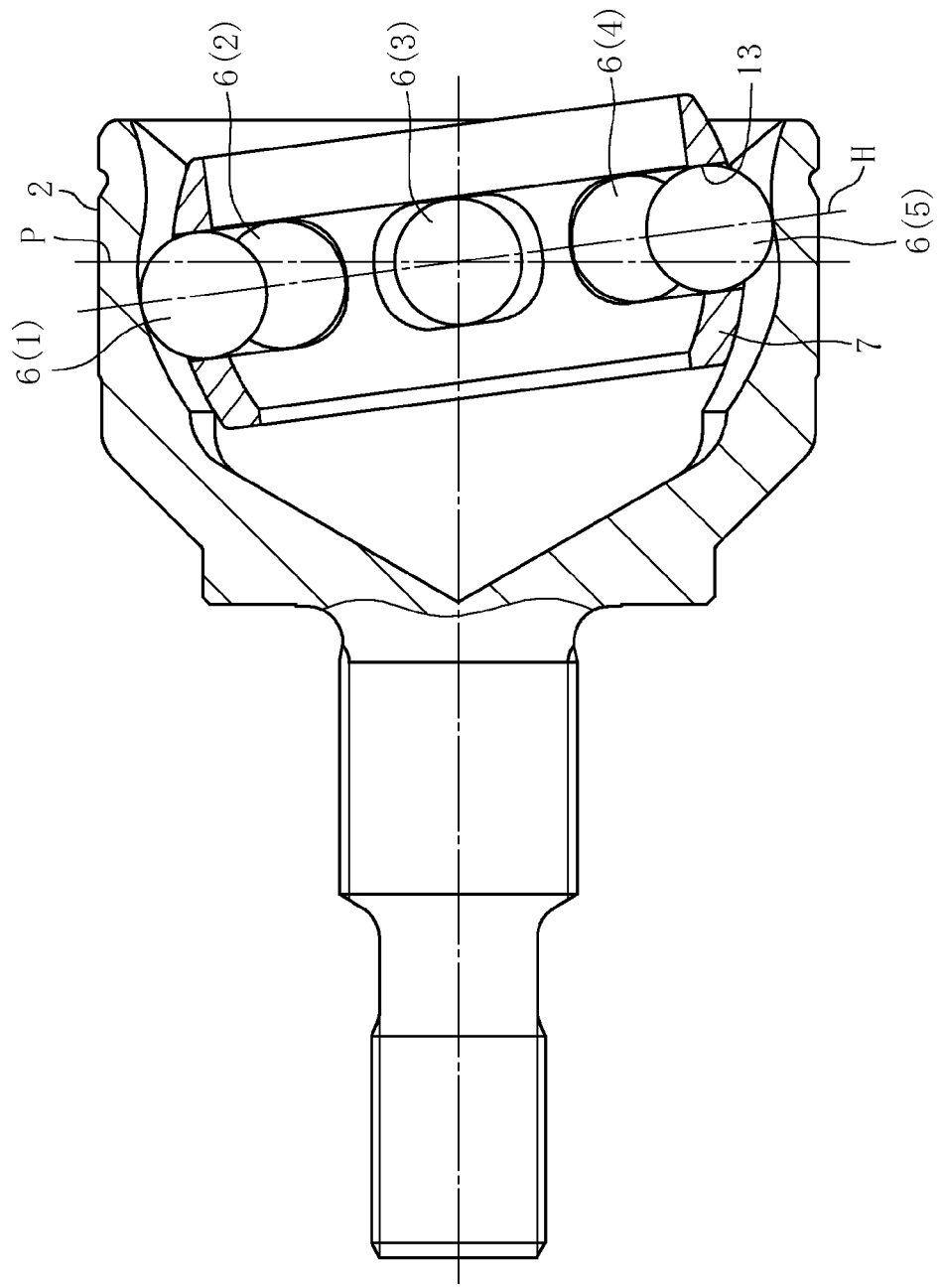
FIG. 6 A vertical sectional view for illustrating a state in which the above-mentioned fixed type constant velocity universal joint forms a reference operating angle.

Next, description is made of operation of the fixed type constant velocity universal joint 1 according to this embodiment. FIG. 6 illustrates a state in which the fixed type constant velocity universal joint 1 is rotated at the reference operating angle of 15° and the balls 6 are positioned on an innermost side of the outer joint member 2. A bisecting plane H in which the eight balls 6 are arrayed forms an angle which is half of a theoretical operating angle of 15° with respect to the joint center plane P when the operating angle is 0°, in other words, an angle of 7.5°. Of the balls 6 in the bisecting plane H, a ball 6 positioned on the innermost side in the track groove 3 of the outer joint member 2 has a rotational phase angle of 0°, and sequential rotational phases angles are set to be 45°, 90°, 135°, 180°, 225°, 270°, and 315° in a clockwise direction. Balls 6 corresponding respectively to those rotational phases angles are denoted by reference numerals 6(1), 6(2), 6(3), 6(4), 6(5), 6(6), 6(7), and 6(8) (refer to FIGS. 1b and 6). The ball 6(1) refers to a ball at a top dead center in FIG. 6, and the ball 6(5) refers to a ball at a bottom dead center in FIG. 6. Table 1 shows proven results of an analysis of the wedge angle of the track groove 3 with regard not only to each of the balls 6(1), 6(2), 6(3), 6(4), and 6(5) illustrated in FIG. 6 but also to each of the other balls 6(6), 6(7), and 6(8) (refer to FIG. 1b). The results shown in Table 1 are obtained through application of torque by right-hand rotation (clockwise direction) from the opening side of the outer joint member to the inner joint member 4. The balls 6 each receive an axial component force in accordance with the wedge angle from the track groove 3 and the track groove 5, and hence a pocket load is generated in each of the pockets 13 of the cage 7. Note that, the wedge angle collectively refers to the wedge angle α formed by an offset and a wedge angle component derived from intersection of the track grooves along with formation of the operating angle unless it is particularly necessary to distinguish the wedge angle α and the wedge angle component from each other.

TABLE 1

| Rotational phase angle | Ball | Direction of wedge angle | Pocket load |
|---|---|---|---|
| 0° | 6(1) | Plus | Low |
| 45° | 6(2) | Plus | Low |
| 90° | 6(3) | Minus | Medium |
| 135° | 6(4) | Minus | Medium |
| 180° | 6(5) | Plus | High |
| 225° | 6(6) | Minus | Medium |
| 270° | 6(7) | Minus | Medium |
| 315° | 6(8) | Plus | Low |

In the following, description is made of a cause of the state of Table 1 with reference to FIG. 5.

(1) Ball 6(1)

The ball 6(1) is positioned on the inner-end side with respect to the point B on the ball-raceway center line x, and hence the theoretical wedge angle α is directed to the plus direction. Thus, a load toward the opening side acts on the pocket 13 of the cage 7.

(2) Ball 6(2)

The ball 6(2) is positioned near the point B on the ball-raceway center line x, and hence the wedge angle α reaches substantially 0°. Further, the wedge angle formed by intersection of the track grooves 3 and 5 of the outer joint member 2 and the inner joint member 4 along with formation of an operating angle is directed to the plus direction, and the load toward the opening side acts on the pocket 13 of the cage 7.

(3) Ball 6(3)

The ball 6(3) is positioned at a point in the joint center plane on the ball-raceway center line x under the state in which the operating angle is 0°, and hence the wedge angle α is directed to the minus direction. Meanwhile, the wedge angle component derived from the intersection of the track grooves 3 and 5 of the outer joint member 2 and the inner joint member 4 along with formation of the operating angle is applied in the plus direction. However, a load toward the inner-end side acts on the pocket 13 of the cage 7.

(4) Ball 6(4)

The ball 6(4) is positioned between the point A and the point C on the ball-raceway center line x, but the wedge angle α is directed to the minus direction. Meanwhile, the wedge angle component derived from the intersection of the track groove 3 of the outer joint member 2 and the track groove 5 of the inner joint member 4 along with formation of the operating angle is applied in the plus direction. However, a load toward the inner-end side acts on the pocket 13 of the cage 7.

(5) Ball 6(5)

The ball 6(5) is positioned at the point A on the ball-raceway center line x, and hence the theoretical wedge angle α reaches 0°. However, a slight wedge angle in the plus direction is formed by influence of gaps between the ball and the track grooves or between the ball and a spherical fitting portion. A force couple derived from a resultant force generated from the other balls onto the cage 7 acts in a direction in which a wedge of the wedge angle in the plus direction of the ball 6(5) is narrowed. Therefore, the pocket load of the ball 6(5) increases in the plus direction so as to suppress the force couple.

(6) Ball 6(6)

Similarly to the ball 6(4), the ball 6(6) is positioned between the point A and the point C on the ball-raceway center line x, and hence the wedge angle α is directed to the minus direction. Accordingly, a load toward the inner-end side acts on the pocket 13 of the cage 7.

(7) Ball 6(7)

Similarly to the ball 6(3), the ball 6(7) is positioned at a point in the joint center plane on the ball-raceway center line x under the state in which the operating angle is 0°, and hence the wedge angle α is directed to the minus direction. Meanwhile, a value derived from the intersection of the track grooves 3 and 5 of the outer joint member 2 and the inner joint member 4 along with formation of the operating angle is added to the wedge angle α. A load toward the inner-end side acts of the pocket 13 on the cage 7 by the ball 6(7).

(8) Ball 6(8)

Similarly to the ball 6(2), the ball 6(8) is positioned near the point B on the ball-raceway center line x, and hence the wedge angle α reaches substantially 0°. However, through application of the wedge angle component derived from the intersection of the track grooves 3 and 5 of the outer joint member 2 and the inner joint member 4 along with formation of an operating angle, a slight wedge angle is formed in the plus direction.

Table 1 shows the wedge angles and the pocket loads at the rotational phase angles of 0°, 45°, 90°, 135°, 180°, 225°, 270°, and 315°. In this state, the wedge angles and the pocket loads vary during right-hand rotation by 45°, but the pocket loads of the joint as a whole are substantially balanced with each other.

In the fixed type constant velocity universal joint 1 according to this embodiment, by the behavior as described above, the pocket loads are generated from the balls 6 to act onto cage 7 in a counterbalancing direction. Thus, a contact pressure at the spherical fitting portion can be reduced, which enables reduction of loss of torque-to-be-transmitted. The number of the balls is not particularly limited, but eight balls are optimum to reduction of the torque loss.

Figure 7:
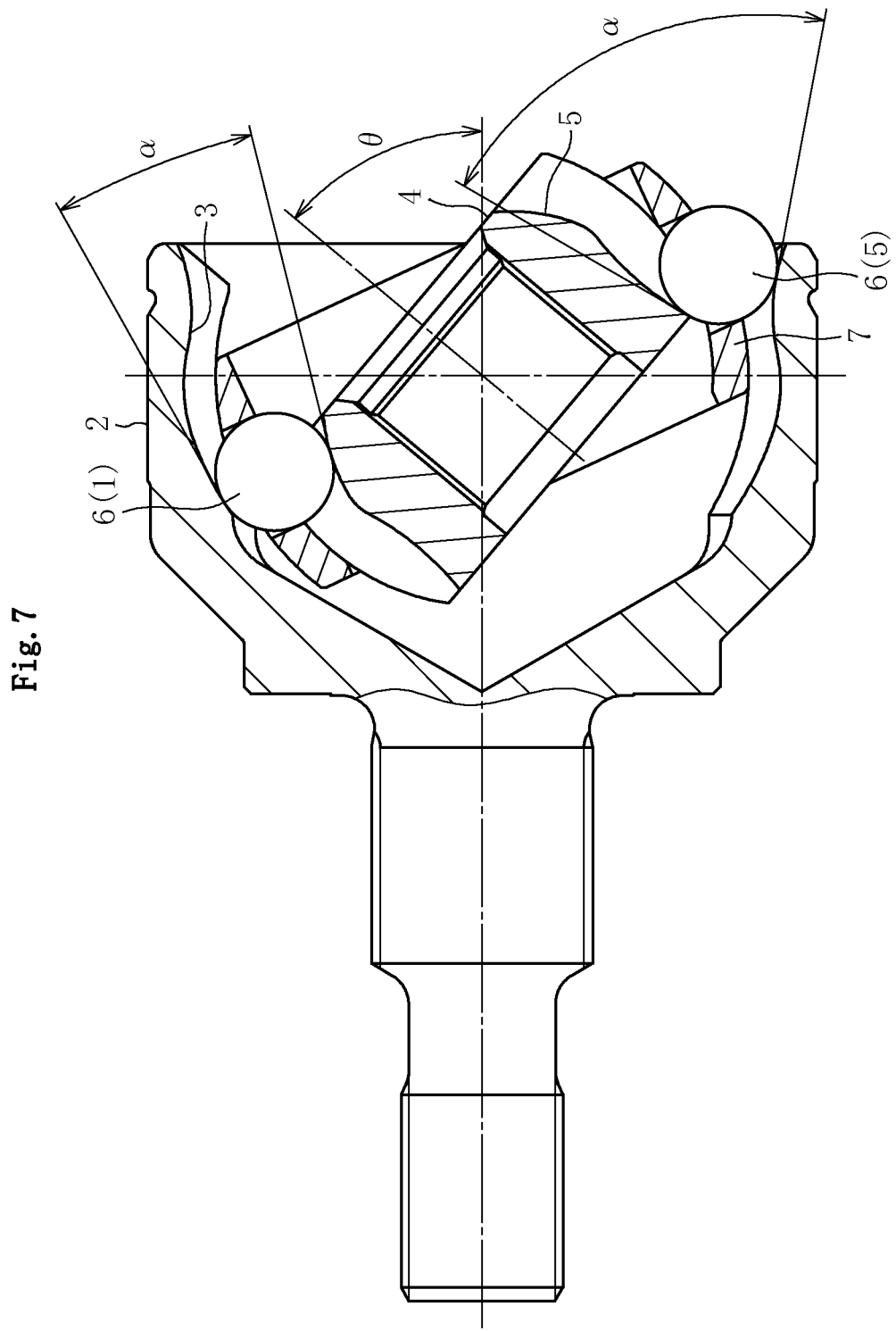
FIG. 7 A vertical sectional view for illustrating a state in which the above-mentioned fixed type constant velocity universal joint forms a maximum operating angle.

FIG. 7 illustrates a state in which the fixed type constant velocity universal joint 1 according to this embodiment forms a maximum operating angle. FIG. 7 illustrates the ball 6(1) and the ball 6(5), and the wedge angle α of each of the ball 6(1) and the ball 6(5) opens to the opening side of the outer joint member 2. Thus, the force couple derived from the force which acts on the cage 7 is suppressed, and hence a posture of the cage 7 is stabilized.

As described above, when the fixed type constant velocity universal joint 1 according to this embodiment is operated by being rotated at a certain operating angle or higher, the pocket loads are generated from the balls 6 to act onto the cage 7 in the counterbalancing direction, with the result that spherical loads between the outer joint member 2 and the cage 7 and between the inner joint member 4 and the cage 7 are reduced. Thus, torque loss is reduced, and efficiency of the fixed type constant velocity universal joint 1 is enhanced. Further, the low spherical loads prevent a spherical center of the cage 7 from being displaced from the joint center, and reduce variation of the track loads during one rotation at an operating angle, with the result that peak loads are reduced. Further, in terms of manufacture, the track grooves 3 and 5 of the outer joint member 2 and the inner joint member 4 are each formed into the same shape, and hence can be easily manufactured. In addition, dimensional management can be facilitated, and dimensional accuracy can be enhanced.

Figure 8:
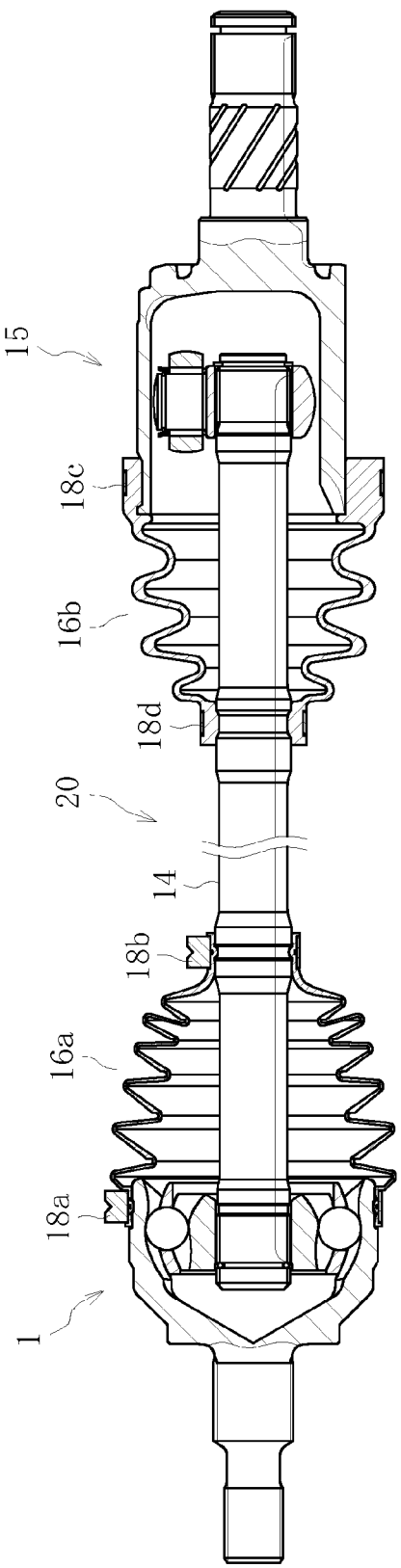
FIG. 8 A vertical sectional view for illustrating a state in which the above-mentioned fixed type constant velocity universal joint is applied to a drive shaft.

FIG. 8 illustrates a drive shaft 20 of an automobile to which the fixed type constant velocity universal joint 1 according to this embodiment is applied. The fixed type constant velocity universal joint 1 is coupled to one end of an intermediate shaft 14, and a plunging tripod type constant velocity universal joint 15 is coupled to another end of the intermediate shaft 14. Between an outer peripheral surface of the fixed type constant velocity universal joint 1 and an outer peripheral surface of the shaft 14 and between an outer peripheral surface of the plunging tripod type constant velocity universal joint 15 and the outer peripheral surface of the shaft 14, bellows boots 16a and 16b are respectively fixed with boot bands 18a, 18b, 18c, and 18d. Grease as a lubricant is sealed in an inside of the joint. With use of the fixed type constant velocity universal joint 1 according to this embodiment, the drive shaft 20 for automobiles involves less torque loss, has higher efficiency, and becomes more lightweight and compact.

Figure 9:
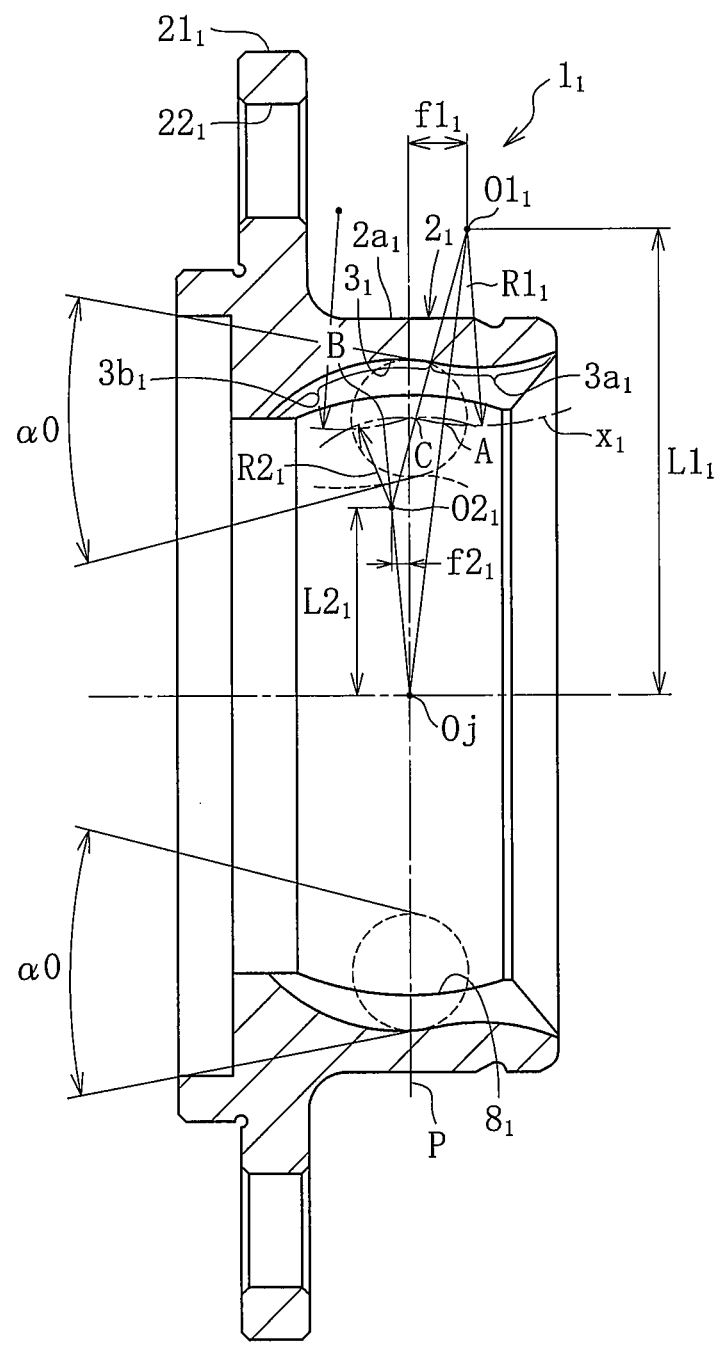
FIG. 9 A vertical sectional view of an outer joint member of a fixed type constant velocity universal joint according to a second embodiment of the present invention.

Next, description is made of a second embodiment of the present invention with reference to FIG. 9. FIG. 9 illustrates only an outer joint member of a fixed type constant velocity universal joint according to the second embodiment. The parts having the same functions as those in the above-mentioned first embodiment are denoted by the same reference symbols except to the subscripts, and redundant description thereof is omitted.

The outer joint member $2_1$ comprises a fixing flange $21_1$ provided on an outer periphery of the mouth portion $2a_1$, and is fixed to a counterpart member with bolts (not shown) inserted into bolt holes $22_1$. The outer joint member $2_1$ has the spherical inner peripheral surface $8_1$ provided with the eight track grooves $3_1$ formed along the axial direction. The ball-raceway center line $x_1$ of the track groove $3_1$ extends along the track groove portion $3a_1$ on the opening side and the track groove portion $3b_1$ on the inner-end side, in other words, comprises two curves. The track groove portions $3a_1$ and $3b_1$ respectively comprising the two curves are smoothly continuous with each other. The part of the ball-raceway center line $x_1$, which corresponds to the track groove portion $3a_1$ on the opening side, comprises the circular arc having the radius $R1_1$ with respect to the curvature center $O1_1$. The curvature center $O1_1$ is offset, with respect to the joint center Oj, by the offset amount $f1_1$ to the opening side in the axial direction, and by the radial offset amount $L1_1$ in the radial direction from the joint axial line. The curvature center $O1_1$ is positioned on the outer side with respect to the outer diameter of the outer joint member $2_1$. The part of the ball-raceway center line $x_1$, which corresponds to the track groove portion $3b_1$ on the inner-end side, comprises the circular arc having the small radius $R2_1$ with respect to the curvature center $O2_1$. The curvature center $O2_1$ is offset, with respect to the joint center Oj, by the offset amount $f2_1$ to the inner-end side in the axial direction, and by the radial offset amount $L2_1$ in the radial direction from the joint axial line. The parts of the ball-raceway center line $x_1$, which correspond respectively to the track groove portions $3a_1$ and $3b_1$ respectively having the two curvature radii $R1_1$ and $R2_1$, are smoothly continuous with each other.

In the fixed type constant velocity universal joint $1_1$ according to this embodiment, the outer joint member $2_1$ comprises the two circular-arc track groove portions $3a_1$ and $3b_1$, and the track groove of the inner joint member is formed into the shape which is mirror-image symmetrical with the track groove $3_1$ of the outer joint member $2_1$ with respect to the joint center plane P under the state in which the operating angle is 0°. The fixed type constant velocity universal joint $1_1$ according to this embodiment is suitable to a use in which high operating angles need not be formed, for example, to a propeller shaft. In this way, a fixed type constant velocity universal joint, which is lightweight, compact, and excellent in strength and durability, and can secure track groove depths required in such a use, can be manufactured by widely used processing techniques such as a grinding process and a quenched-steel trimming process.

The track groove portion $3c$ of the outer joint member 2 in the first embodiment is omitted from the track groove $3_1$ of the outer joint member $2_1$ in this embodiment. A normal angle in the use for propeller shafts is small, specifically, approximately 5°, and hence, in accordance therewith, the reference operating angle, and the operating angles θ1 and θ2 at each of which the wedge angle α reaches 0° first are set to be low. In FIG. 9, for the sake of simplicity in illustration, the offset amounts $f1_1$ and $f2_1$ in the axial direction are indicated on an exaggerated scale. The reference operating angle, and the operating angles θ1 and θ2 at each of which the wedge angle α reaches 0° first are low. Meanwhile, how the wedge angle α varies in a use condition of a propeller shaft is the same as that in the first embodiment, and hence description thereof is omitted.

Figure 10:
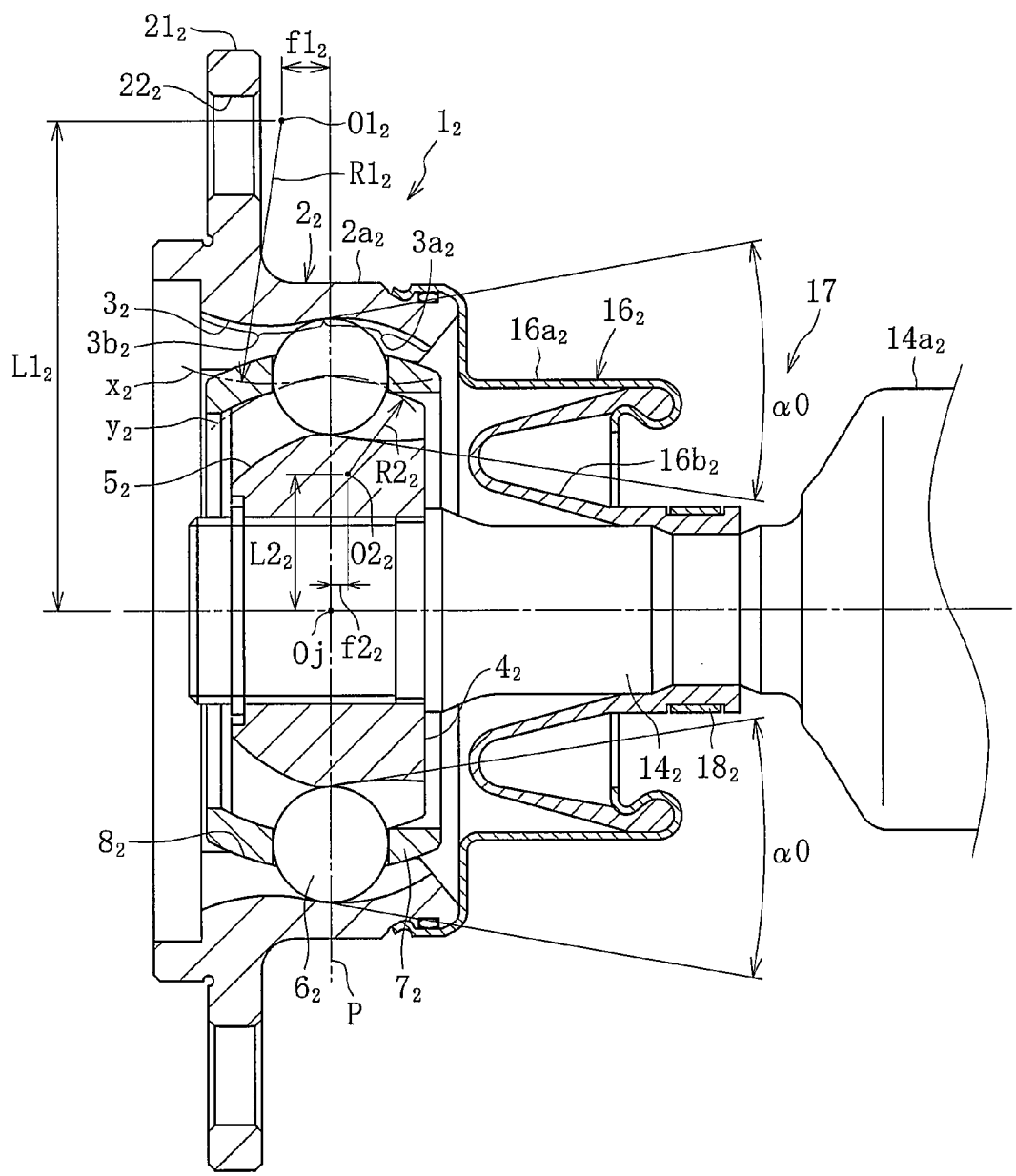
FIG. 10 A vertical sectional view for illustrating a state in which a fixed type constant velocity universal joint according to a third embodiment of the present invention is applied to a propeller shaft.

Next, description is made of a fixed type constant velocity universal joint according to a third embodiment of the present invention with reference to FIG. 10. This fixed type constant velocity universal joint $1_2$ comprises the outer joint member $2_2$, the inner joint member $4_2$, the balls $6_2$, and the cage $7_2$. A boot $16_2$ is fixed to the outer peripheral surface of the outer joint member $2_2$ and the outer peripheral surface of the shaft $14_2$ spline-coupled to an inner peripheral hole of the inner joint member $4_2$, and grease as a lubricant is sealed in the inside of the joint. In FIG. 10, the fixed type constant velocity universal joint $1_2$ according to this embodiment is used for a propeller shaft of an automobile. The shaft $14_2$ comprises a pipe portion $14a_2$ having a large diameter, and the another end of the shaft $14_2$ is coupled to a plunging type constant velocity universal joint or a fixed type constant velocity universal joint (not shown) to serve as a propeller shaft 17. The boot $16_2$ comprises a sealing ring $16a_2$ fixed by crimping to an outer peripheral surface of an opening portion of the outer joint member $2_2$, and an elastic boot portion $16b_2$ having one end fixed to the sealing ring $16a_2$ and another end fixed to the shaft $14_2$ with a boot band $18_2$. The outer joint member $2_2$ comprises the fixing flange $21_2$ provided on the outer periphery of the mouth portion $2a_2$, and is fixed to a counterpart member with the bolts (not shown) inserted into the bolt holes $22_2$. In order that description hereinabove is applied also to the outer joint member $2_2$ of a flange type, a side on which the shaft $14_2$ and the boot $16_2$ are fixed is referred to as opening side, and a side opposite thereto is referred to as inner-end side.

The outer joint member $2_2$ has the spherical inner peripheral surface $8_2$ provided with the eight track groove $3_2$ formed along the axial direction. The ball-raceway center line $x_2$ of the track groove $3_2$ extends along the track groove portion $3a_2$ on the opening side and the track groove portion $3b_2$ on the inner-end side, in other words, comprises two curves. The track groove portions $3a_2$ and $3b_2$ respectively comprising the two curves are smoothly continuous with each other. The part of the ball-raceway center line $x_2$, which corresponds to the track groove portion $3a_2$ on the opening side, comprises a circular arc having the relatively small radius $R2_2$ with respect to the curvature center $O2_2$. The curvature center $O2_2$ is offset, with respect to the joint center Oj, by the offset amount $f2_2$ to the opening side in the axial direction, and by the radial offset amount $L2_2$ in the radial direction from the joint axial line. The part of the ball-raceway center line $x_2$, which corresponds to the track groove portion $3b_2$ on the inner-end side, comprises the circular arc having the radius $R1_2$ with respect to the curvature center $O1_2$. The curvature center $O1_2$ is offset, with respect to the joint center Oj, by the offset amount $f1_2$ to the inner-end side in the axial direction, and by the radial offset amount $L1_2$ in the radial direction from the joint axial line. The curvature center $O1_2$ is positioned on the outer side with respect to the outer diameter of the outer joint member $2_2$. The parts of the ball-raceway center line $x_2$, which correspond respectively to the track groove portions $3b_2$ and $3a_2$ respectively having the two curvature radii $R1_2$ and $R2_2$, are smoothly continuous with each other. The track groove $5_2$ of the inner joint member $4_2$ is formed into the shape which is mirror-image symmetrical with the track groove $3_2$ of the outer joint member $2_2$ with respect to the joint center plane P under the state in which the operating angle is 0°. In the fixed type constant velocity universal joint $1_2$, the wedge angle α formed between the track grooves $3_2$ and $5_2$ of the outer joint member $2_2$ and the inner joint member $4_2$ switches in an order of the minus direction, the plus direction, and the minus direction from the inner-end side to the opening side, which is reverse to that in the above-mentioned fixed type constant velocity universal joints 1, $1_1$ according to the first and second embodiments. The propeller shaft need not form high operating angles, and hence, even in consideration of how to fix the boot, the above-mentioned variation of the wedge angle contributes to further weight reduction and compactification.

The fixed type constant velocity universal joint $1_2$ according to this embodiment is designed for propeller shafts. Thus, as in the second embodiment, with regard to the track grooves $3_2$ and $5_2$ of the outer joint member $2_2$ and the inner joint member $4_2$, the reference operating angle, and the operating angles θ1 and θ2 at each of which the wedge angle α reaches 0° first are set to be low, and the offset amounts $f1_2$ and $f2_2$ in the axial direction are indicated on an exaggerated scale. In this fixed type constant velocity universal joint $1_2$, the wedge angle α switches in the order of the minus direction, the plus direction, and the minus direction from the inner-end side to the opening side, which is reverse to that in the fixed type constant velocity universal joints 1, $1_1$ according to the first and second embodiments. With use of the fixed type constant velocity universal joint 1 according to this embodiment, the propeller shaft for automobiles involves less torque loss, has higher efficiency, and becomes more lightweight and compact.

FIGS. 11a to 18 illustrate a fourth embodiment of the present invention. FIGS. 11a and b illustrate an entire fixed type constant velocity universal joint 1 according to this embodiment. FIG. 11a is a vertical sectional view of the fixed type constant velocity universal joint $1_3$, and FIG. 11b is a front view thereof. The fixed type constant velocity universal joint 1 according to this embodiment is different from the fixed type constant velocity universal joint 1 according to the first embodiment in shape of the track groove on the opening side of the outer joint member 2. Specifically, the track groove portion $3a$ on the opening side of the outer joint member 2 in the first embodiment (refer to FIG. 2) has a circular-arc shape and extends up to an opening end portion, but in this embodiment, the track groove on the opening side of the outer joint member $2_3$ comprises a straight portion (a linear portion) formed up to the opening end portion continuously with the circular-arc portion (refer to FIG. 12).

As illustrated in FIGS. 11a and b, the fixed type constant velocity universal joint $1_3$ according to this embodiment comprises the outer joint member $2_3$, the inner joint member $4_3$, the balls $6_3$, and the cage $7_3$. In the spherical inner peripheral surface $8_3$ of the outer joint member $2_3$, the eight track grooves $3_3$ are formed equiangularly along the axial direction. In the spherical outer peripheral surface $9_3$ of the inner joint member $4_3$, the eight track grooves $5_3$ facing the track grooves $3_3$ of the outer joint member $2_3$ are formed equiangularly along the axial direction. Between the track grooves $3_3$ of the outer joint member $2_3$ and the track grooves $5_3$ of the inner joint member $4_3$, eight balls $6_3$ for transmitting torque are interposed. Between the spherical inner peripheral surface $8_3$ of the outer joint member $2_3$ and the spherical outer peripheral surface $9_3$ of the inner joint member $4_3$, the cage $7_3$ for holding the balls $6_3$ is arranged. The outer joint member $2_3$ comprises the mouth portion $2a_3$ and the stem portion $2b_3$ provided integrally with each other. The inner joint member $4_3$ comprises the spline hole $10_3$ provided along the inner periphery thereof so as to be spline-coupled to a shaft (not shown). The outer peripheral surface of the outer joint member $2_3$ and the outer peripheral surface of the shaft are covered with a boot (not shown), and grease as lubricant is sealed inside the joint.

Curvature centers of the spherical inner peripheral surface $8_3$ of the outer joint member $2_3$ and the spherical outer peripheral surface $9_3$ of the inner joint member $4_3$ each match with the joint center Oj. The ball-raceway center line $x_3$ of the track groove $3_3$ of the outer joint member $2_3$ and the ball-raceway center line $y_3$ of the track groove $5_3$ of the inner joint member $4_3$ are each indicated by a dashed line. Detailed description thereof is made with reference to FIGS. 12 to 13b.

Figure 12:
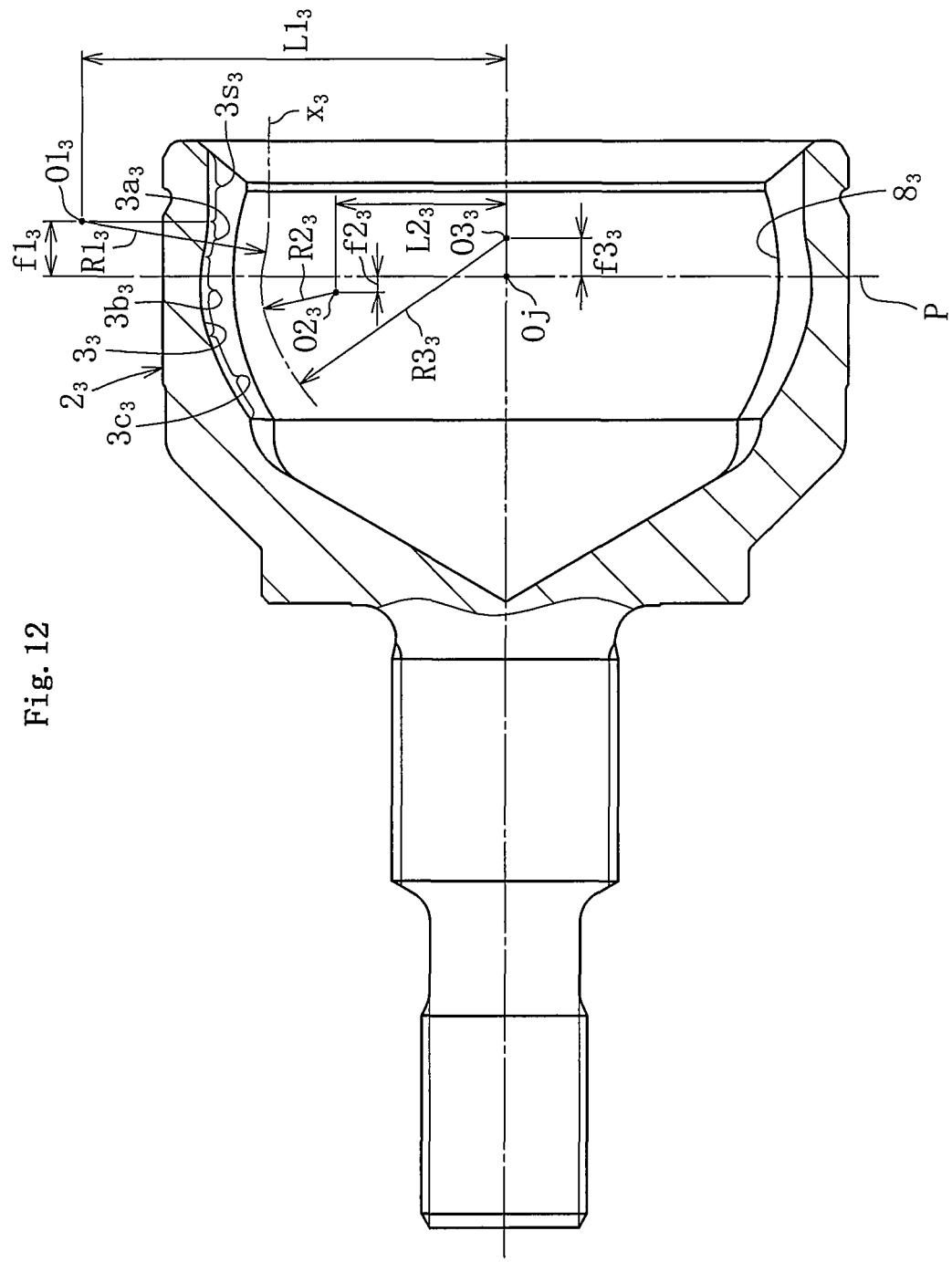
FIG. 12 A vertical sectional view of an outer joint member of the above-mentioned fixed type constant velocity universal joint.

In FIG. 12, the ball-raceway center line $x_3$ of the track groove $3_3$ of the outer joint member $2_3$ is indicated. The ball-raceway center line $x_3$ extends along the track groove portion $3b_3$ in the region comprising the joint center plane P under the state in which the operating angle θ is 0°, the track groove portion $3c_3$ on the inner-end side, the track groove portion $3a_3$ on the opening side, and a straight track groove portion (a linear track groove portion) $3s_3$ continuous with the track groove portion $3a_3$. The track groove portions $3a_3$, $3b_3$, and $3c_3$ respectively comprise three different curves, and the straight track groove portion $3s_3$ continuous with the track groove portion $3a_3$ on the opening side is formed up to the opening end portion. The track groove portions $3a_3$, $3b_3$, and $3c_3$ respectively comprising the three different curves and the straight track groove portion $3s_3$ are smoothly continuous with each other. The part of the ball-raceway center line $x_3$, which corresponds to the track groove portion $3a_3$ on the opening side, comprises the circular arc having the radius $R1_3$ with respect to the curvature center $O1_3$. The curvature center $O1_3$ is offset, with respect to the joint center Oj, by the offset amount $f1_3$ to the opening side in the axial direction, and by the radial offset amount $L1_3$ in the radial direction from the joint axial line. The curvature center $O1_3$ is positioned on the outer side with respect to the outer diameter of the outer joint member $2_3$. The straight track groove portion $3s_3$ is tangentially continuous with the track groove portion $3a_3$ on the opening side, and extends parallel to an axial line of the outer joint member $2_3$. The part of the ball-raceway center line $x_3$, which corresponds to the track groove portion $3b_3$ in the region comprising the joint center plane P under the state in which the operating angle α is 0°, comprises the circular arc having the small radius $R2_3$ with respect to the curvature center $O2_3$. The curvature center $O2_3$ is offset, with respect to the joint center Oj, by the offset amount $f2_3$ to the inner-end side in the axial direction, and by the radial offset amount $L2_3$ in the radial direction from the joint axial line. The part of the ball-raceway center line $x_3$, which corresponds to the track groove portion $3c_3$ on the inner-end side, comprises the circular arc having the relatively large radius $R3_3$ with respect to the curvature center $O3_3$. The curvature center $O3_3$ is offset, with respect to the joint center Oj, by the offset amount $f3_3$ to the opening side in the axial direction, and positioned on the joint axial line without being offset in the radial direction. The parts of the ball-raceway center line $x_3$, which correspond respectively to the track groove portions $3a_3$, $3b_3$, and $3c_3$ respectively having the three curvature radii $R1_3$, $R2_3$, and $R3_3$ and the straight track groove portion $3s_3$, are smoothly continuous with each other.

Figure 13A:
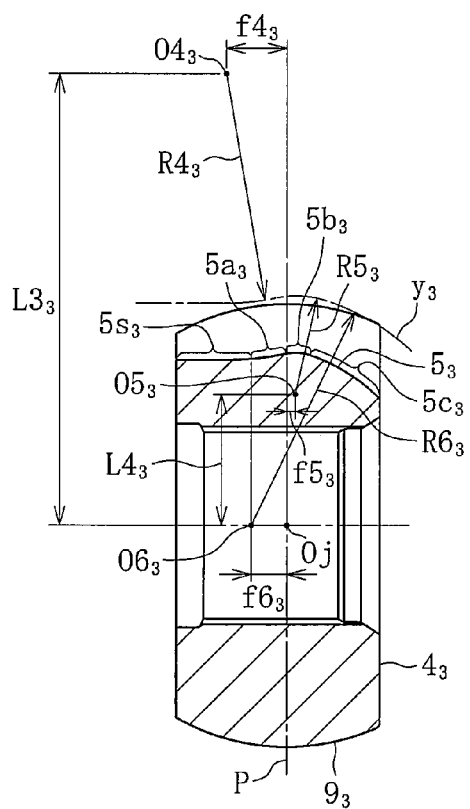
FIG. 13a A vertical sectional view of an inner joint member.
Figure 13B:
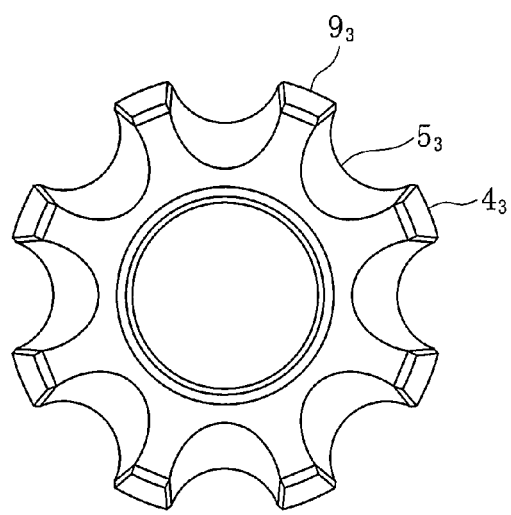
FIG. 13b A front view of the inner joint member.

FIGS. 13a and b illustrate the inner joint member $4_3$. FIG. 13a is a vertical sectional view of the inner joint member $4_3$, and FIG. 13b is a front view of the inner joint member $4_3$. As illustrated in FIG. 13a, the ball-raceway center line $y_3$ extends along the track groove $5_3$ of the inner joint member $4_3$. Under the state in which the operating angle α is 0°, the track groove $5_3$ of the inner joint member $4_3$ is formed into the shape which is mirror-image symmetrical with the track groove $3_3$ of the outer joint member $2_3$ as a counterpart with respect to the joint center plane P. The ball-raceway center line $y_3$ of the track groove $5_3$ of the inner joint member $4_3$ extends along the track groove portion $5b_3$ in the region comprising the joint center plane P under the state in which the operating angle α is 0°, the track groove portion $5c_3$ on the opening side, and the track groove portion $5a_3$ on the inner-end side, and a straight track groove portion $5s_3$ continuous with the track groove portion $5a_3$. The track groove portions $5a_3$, $5b_3$, and $5c_3$ respectively comprise three different curves, and the straight track groove portion $5s_3$ continuous with the track groove portion $5a_3$ on the inner-end side is formed up to an end portion on the inner-end side. The track groove portions $5a_3$, $5b_3$, and $5c_3$ respectively comprising the three different curves and the straight track groove portion $5s_3$ are smoothly continuous with each other. The part of the ball-raceway center line $y_3$, which corresponds to the track groove portion $5a_3$ on the inner-end side, comprises the circular arc having the radius $R4_3$ with respect to the curvature center $O4_3$. The curvature center $O4_3$ is offset, with respect to the joint center Oj, by the offset amount $f4_3$ to the inner-end side in the axial direction, and by the radial offset amount $L3_3$ in the radial direction from the joint axial line. The curvature center $O4_3$ is positioned on the outer side with respect to the outer diameter of the inner joint member $4_3$. The straight track groove portion $5s_3$ is tangentially continuous with the track groove portion $5a_3$ on the inner-end side, and extends parallel to the axial line of the inner joint member $4_3$. The part of the ball-raceway center line $y_3$, which corresponds to the track groove portion $5_3b$ in the region comprising the joint center plane P under the state in which the operating angle α is 0°, comprises the circular arc having the small radius $R5_3$ with respect to the curvature center $O5_3$. The curvature center $O5_3$ is offset, with respect to the joint center Oj, by the offset amount $f5_3$ to the opening side in the axial direction, and by the radial offset amount $L4_3$ in the radial direction from the joint axial line. The part of the ball-raceway center line $y_3$, which corresponds to the track groove portion $5c_3$ on the opening side, comprises the circular arc having the relatively large radius $R6_3$ with respect to the curvature center $O6_3$. The curvature center $O6_3$ is offset, with respect to the joint center Oj, by the offset amount $f6_3$ to the inner-end side in the axial direction, and positioned on the joint axial line without being offset in the radial direction. The parts of the ball-raceway center line $x_3$, which correspond respectively to the track groove portions $5a_3$, $5b_3$, and $5c_3$ respectively having the three curvature radii $R4_3$, $R5_3$, and $R6_3$ and the straight track groove portion $5s_3$, are smoothly continuous with each other. Further, as in the first embodiment, the offset amounts $f4_3$, $f5_3$, and $f6_3$, the radial offset amounts $L3_3$ and $L4_3$, and the curvature radii $R4_3$, $R5_3$, and $R6_3$ are set to correspond respectively to the offset amounts $f1_3$, $f2_3$, and $f3_3$, the radial offset amounts $L1_3$ and $L2_3$, and the curvature radii $R1_3$, $R2_3$, and $R3_3$ of the outer joint member $2_3$ of FIG. 12.

The ball-raceway center line $x_3$ of the track groove $3_3$ of the outer joint member $2_3$ and the ball-raceway center line $y_3$ of the track groove $5_3$ of the inner joint member $4_3$, which are indicated in FIGS. 11a to 13b, each match with the ball center trajectory to move in the track grooves $3_3$ and $5_3$. Normally, the ball 6 is held in contact with the track grooves $3_3$ and $5_3$ at a contact angle (approximately from 30° to 40°), and hence the ball $6_3$ and the track grooves $3_3$ and $5_3$ are held in contact with each other actually at positions on the side surface sides of the track grooves $3_3$ and $5_3$, which are slightly spaced apart from the groove bottoms of the track grooves $3_3$ and $5_3$. As in the first embodiment described above, for the sake of convenience in illustration, the wedge angle α formed between the track grooves $3_3$ and $5_3$ is indicated as that formed between the groove bottoms of the track grooves $3_3$ and $5_3$. As illustrated in FIGS. 11a and b, also in the fixed type constant velocity universal joint $1_3$ according to this embodiment, the wedge angle α0 opens to the inner-end side of the outer joint member $2_3$.

Figure 14A:
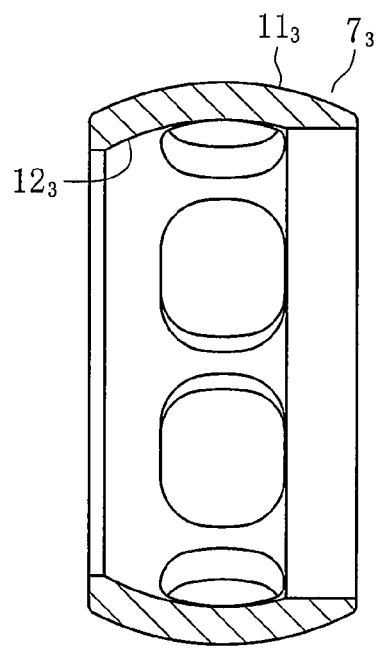
FIG. 14a A vertical sectional view of a cage.
Figure 14B:
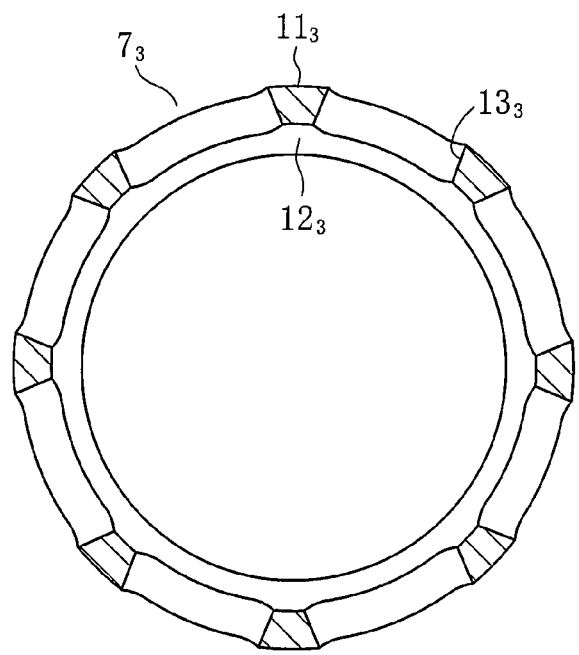
FIG. 14b A horizontal sectional view of the cage.
Figure 15:
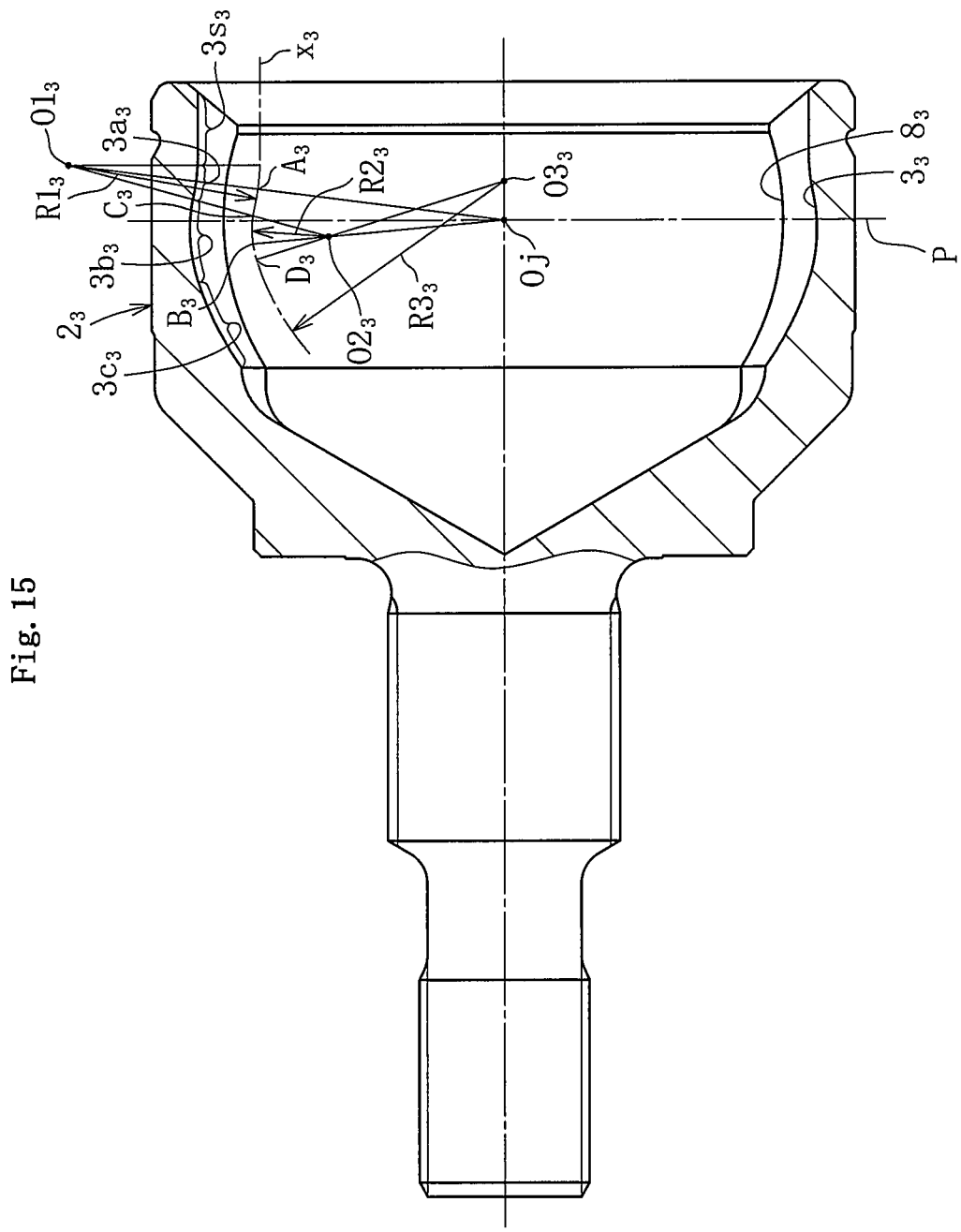
FIG. 15 A vertical sectional view of the outer joint member, for illustrating how a wedge angle is formed.
Figure 16:
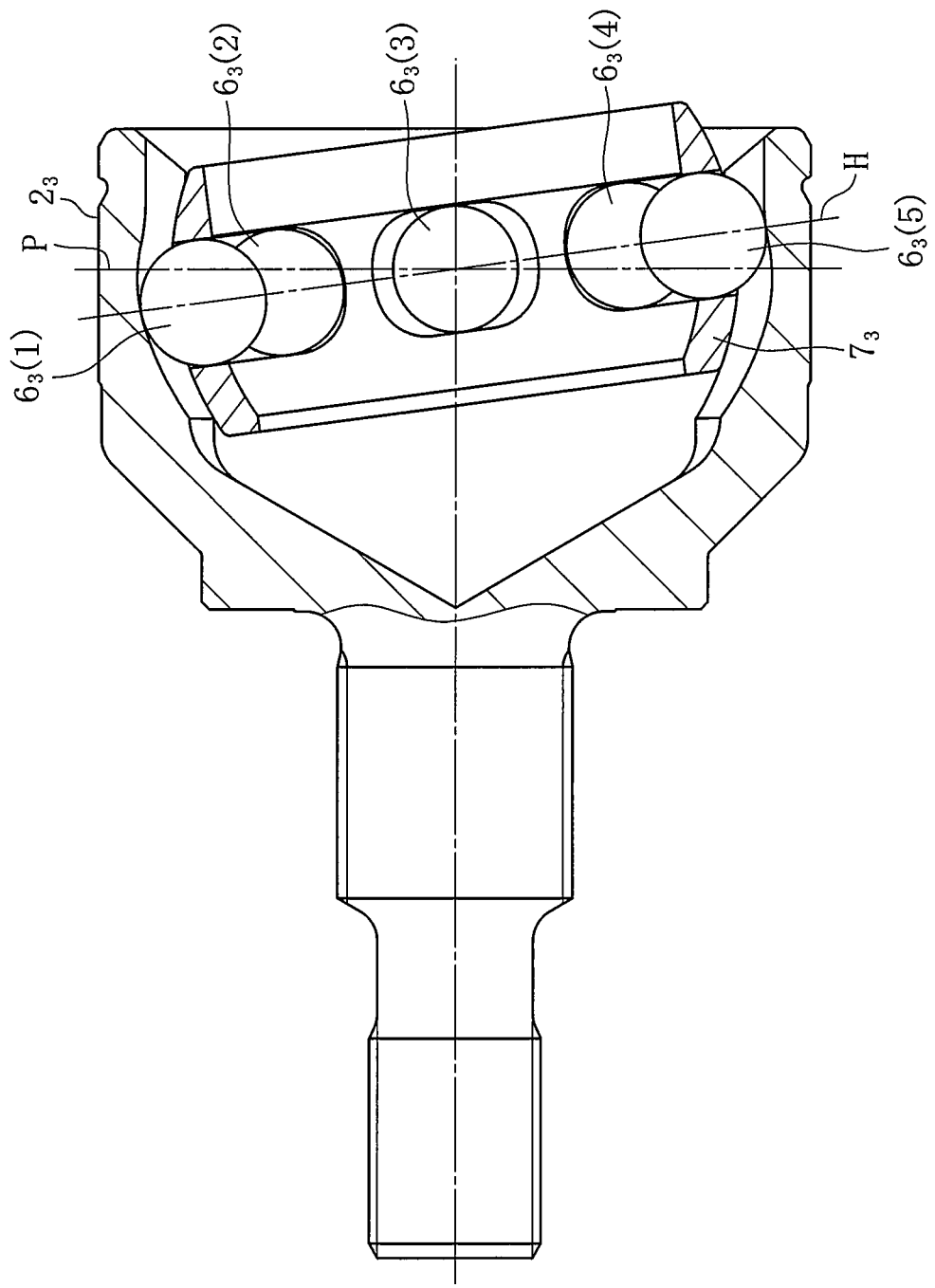
FIG. 16 A vertical sectional view for illustrating a state in which the above-mentioned fixed type constant velocity universal joint forms a reference operating angle.
Figure 17:
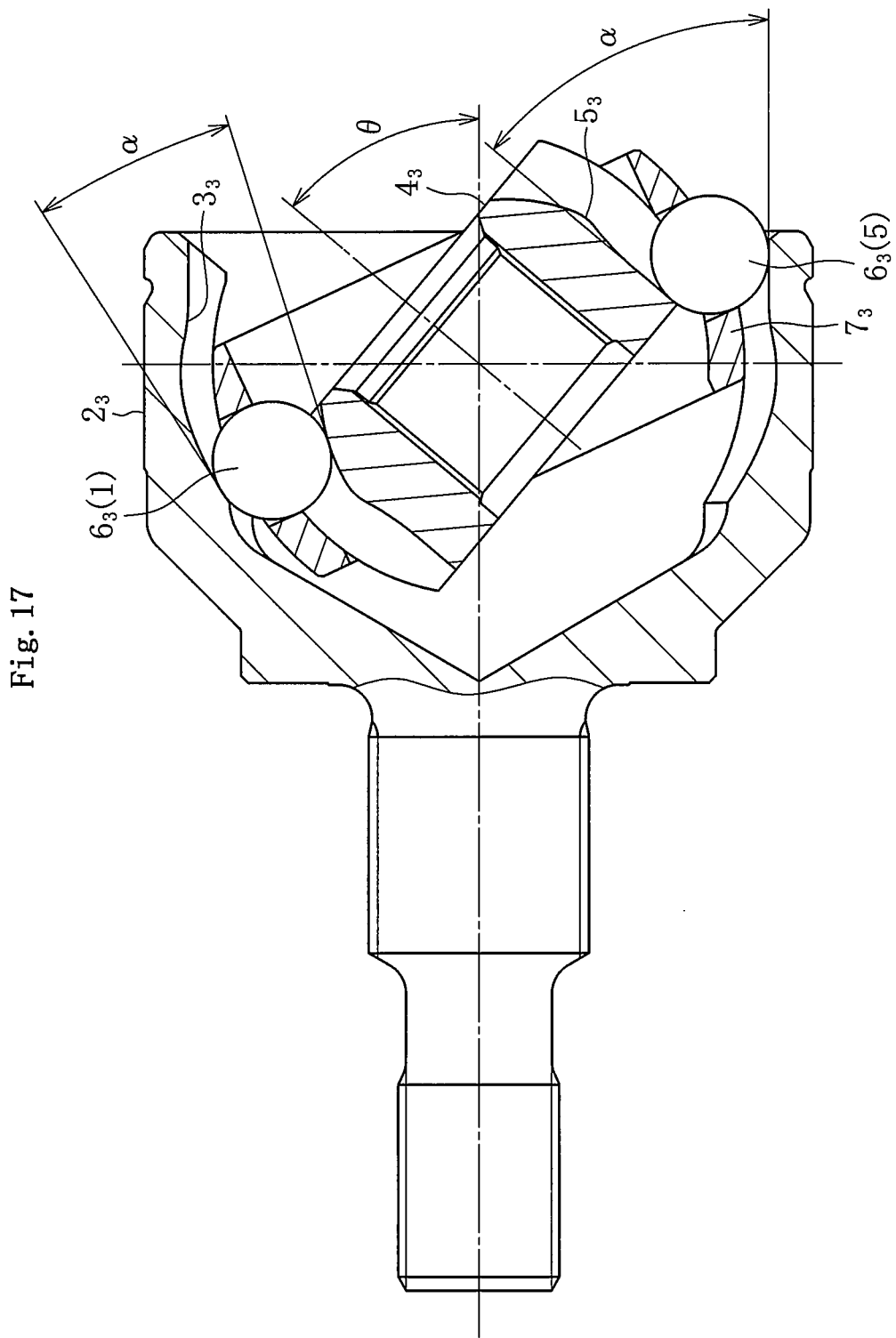
FIG. 17 A vertical sectional view for illustrating a state in which the above-mentioned fixed type constant velocity universal joint forms a maximum operating angle.

FIGS. 14a and b illustrate the cage $7_3$. FIG. 14a is a vertical sectional view of the cage $7_3$, and FIG. 14b is a horizontal sectional view of the cage $7_3$. The cage $7_3$ is the same as the cage 7 of the fixed type constant velocity universal joint 1 according to the first embodiment, and hence description thereof is omitted.

The track groove $3_3$ of the outer joint member $2_3$ in this embodiment is formed by connecting the track groove portion $3a$ on the opening side of the outer joint member 2 in the first embodiment to the straight track groove portion $3s_3$. The reference operating angle, the operating angles θ1 and θ2 at each of which the wedge angle α reaches 0° first, and how the wedge angle α varies are the same as those in the first embodiment. Thus, the parts having the same functions as those in the first embodiment are denoted by the same reference symbols except to the subscripts, and redundant description thereof is omitted with regard to FIGS. 15 to 17 and Table 1.

The fixed type constant velocity universal joint $1_3$ according to this embodiment not only has the same functions and advantages as those of the fixed type constant velocity universal joint according to the first embodiment, but also comprises the straight track groove portions $3s_3$ and $5s_3$ respectively formed at the opening end portion of the track groove $3_3$ of the outer joint member $2_3$ and the end portion on the inner-end side of the track groove $5_3$ of the inner joint member $4_3$ and extending parallel to the axial line of the joint. Through management of those parts, dimensional management of the joint member as a whole can be facilitated.

Figure 18:
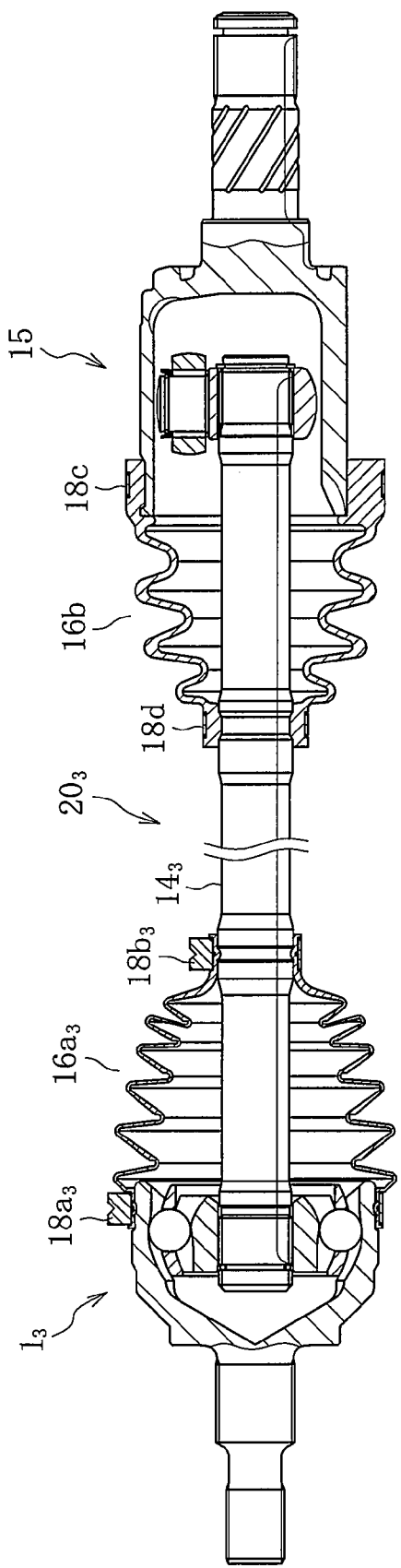
FIG. 18 A vertical sectional view for illustrating a state in which the above-mentioned fixed type constant velocity universal joint is applied to a drive shaft.

FIG. 18 illustrates a drive shaft $20_3$ of an automobile to which the fixed type constant velocity universal joint $1_3$ according to this embodiment is applied. The fixed type constant velocity universal joint $1_3$ is coupled to one end of the intermediate shaft $14_3$, and the plunging tripod type constant velocity universal joint 15 is coupled to another end of the intermediate shaft $14_3$. The parts having the same functions as those in the above-mentioned embodiment of FIG. 8 are denoted by the same reference symbols except to the subscripts, and redundant description thereof is omitted.

Figure 19:
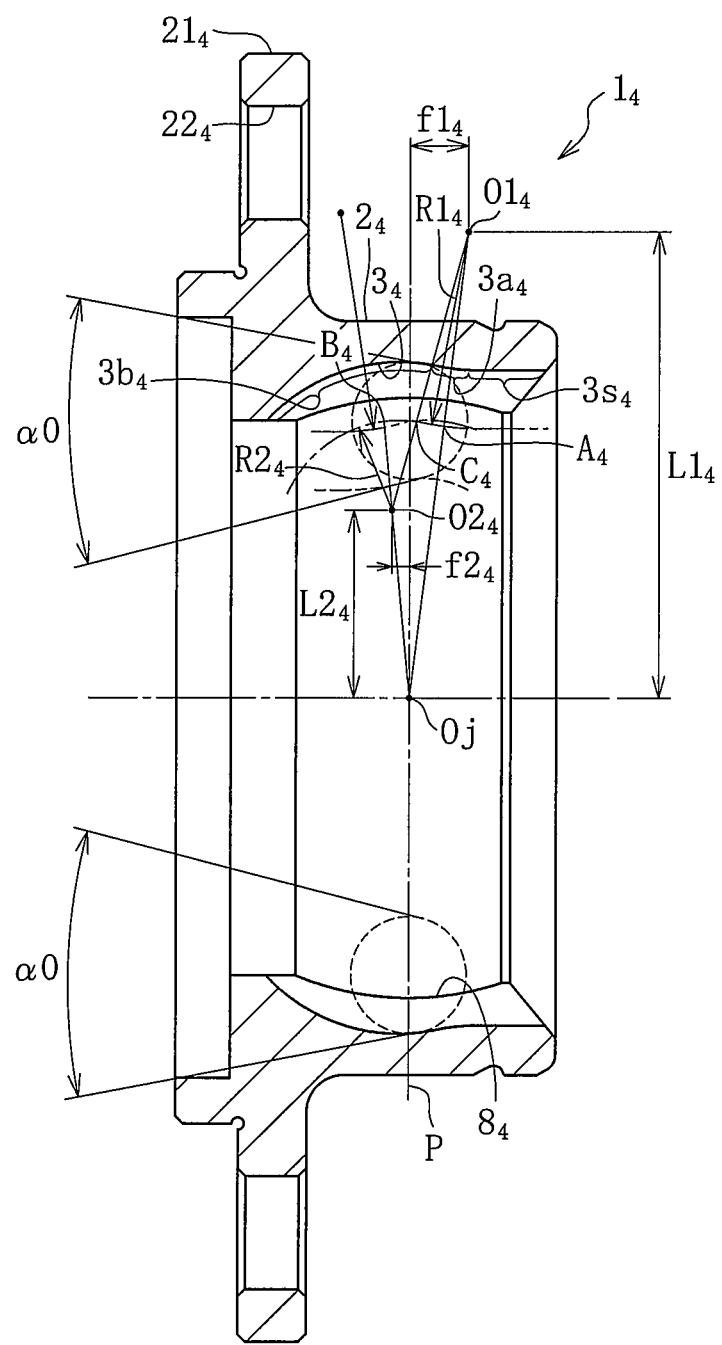
FIG. 19 A vertical sectional view of an outer joint member of a fixed type constant velocity universal joint according to a fifth embodiment of the present invention.

Next, description is made of a fifth embodiment of the present invention with reference to FIG. 19. FIG. 19 illustrates only an outer joint member of a fixed type constant velocity universal joint according to the fifth embodiment. The fixed type constant velocity universal joint $1_4$ according to this embodiment is designed for propeller shafts. Thus, as in the second embodiment, with regard to the track grooves of the outer joint member and the inner joint member, the reference operating angle, and the operating angles θ1 and θ2 at each of which the wedge angle α reaches 0° first are set to be low, and the offset amounts $f1_4$ and $f2_4$ in the axial direction are indicated on an exaggerated scale. The reference operating angle, and the operating angles θ1 and θ2 at each of which the wedge angle α reaches 0° first are low. Meanwhile, how the wedge angle α varies in the use condition of a propeller shaft is the same as that in the first embodiment, and hence description thereof is omitted.

Figure 20:
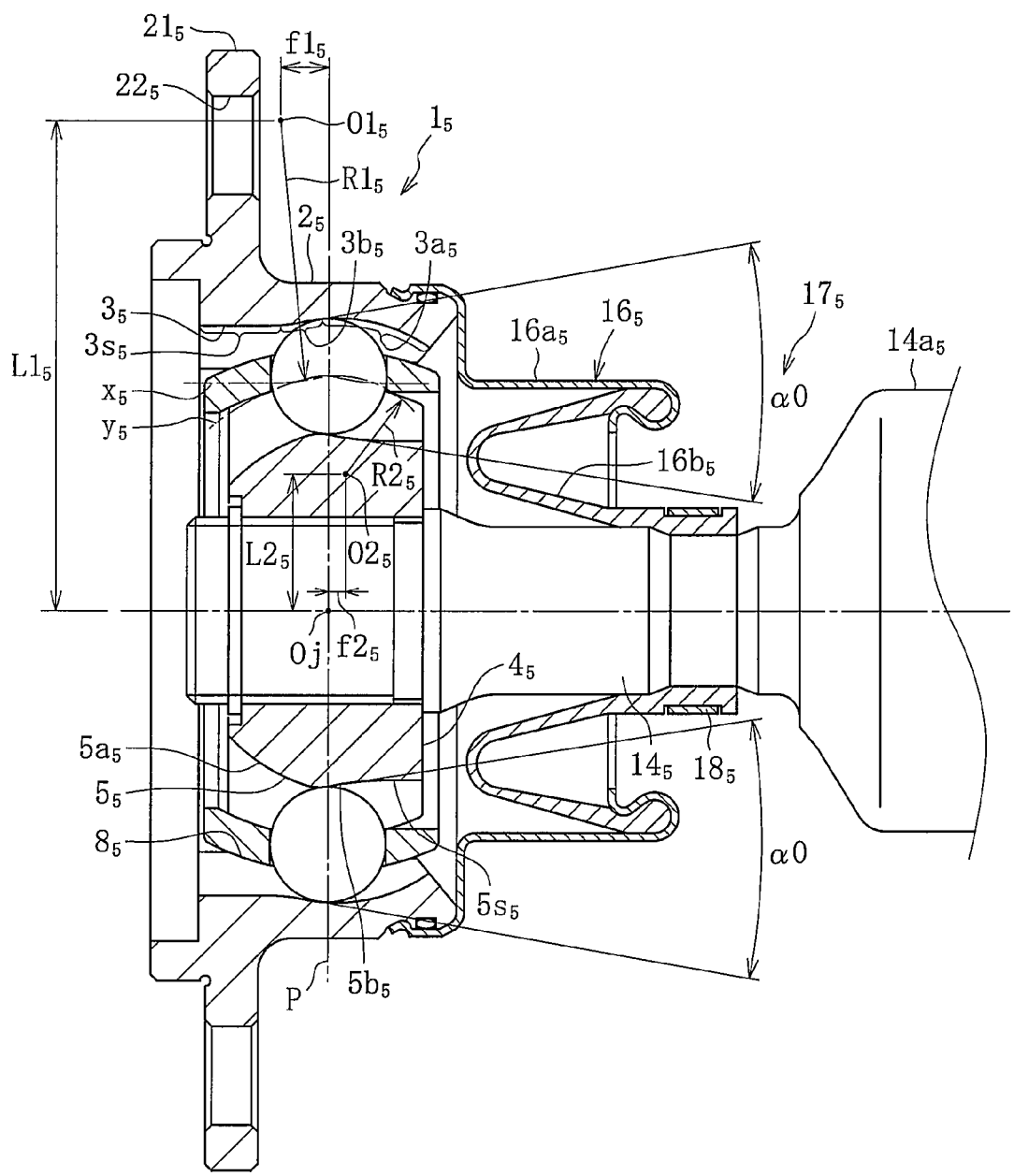
FIG. 20 A vertical sectional view for illustrating a state in which a fixed type constant velocity universal joint according to a sixth embodiment of the present invention is applied to a propeller shaft.

Next, description is made of a fixed type constant velocity universal joint according to a sixth embodiment of the present invention with reference to FIG. 20. This fixed type constant velocity universal joint $1_5$ is different from that according to the third embodiment (FIG. 10) in the structure in which the track grooves $3_5$ and $5_5$ of the outer joint member $2_5$ and the inner joint member $4_5$ respectively comprise the straight track groove portions $3s$ and $5s$. As in the third embodiment, the fixed type constant velocity universal joint $1_5$ according to this embodiment is used for a propeller shaft $17_5$ of an automobile.

The outer joint member $2_5$ has the spherical inner peripheral surface $8_5$ provided with the eight track grooves $3_5$ formed along the axial direction. The ball-raceway center line $x_5$ of the track groove $3_5$ extends along the two curves of the track groove portion $3a_5$ on the opening side and the track groove portion $3b_5$ on the inner-end side, and the straight track groove portion $3s_5$ continuous with the track groove portion $3b_5$ on the inner-end side. The track groove portions $3a_5$, $3b_5$, and $3s_5$ are smoothly continuous with each other. The part of the ball-raceway center line $x_s$, which corresponds to the track groove portion $3a_5$ on the opening side, comprises the circular arc having the relatively small radius $R2_5$ with respect to the curvature center $O2_5$. The curvature center $O2_5$ is offset, with respect to the joint center Oj, by the offset amount $f2_5$ to the opening side in the axial direction, and by the radial offset amount $L2_5$ in the radial direction from the joint axial line. The part of the ball-raceway center line $x_5$, which corresponds to the track groove portion $3b_5$ on the inner-end side, comprises the circular arc having the radius $R1_5$ with respect to the curvature center $O1_5$. The curvature center $O1_5$ is offset, with respect to the joint center Oj, by the offset amount $f1_5$ to the inner-end side in the axial direction, and by the radial offset amount $L1_5$ in the radial direction from the joint axial line. The curvature center $O1_5$ is positioned on the outer side with respect to the outer diameter of the outer joint member $2_5$. The straight track groove portion $3s_5$ is tangentially continuous with the track groove portion $3b_5$ on the inner-end side, and extends parallel to the axial line of the joint. The parts of the ball-raceway center line $x_5$, which correspond respectively to the track groove portions $3a_5$, $3b_5$, and $3s_5$, are smoothly continuous with each other. The track groove $5_5$ of the inner joint member $4_5$ is formed into the shape which is mirror-image symmetrical with the track groove $3_5$ of the outer joint member $2_5$ with respect to the joint center plane P. In this fixed type constant velocity universal joint $1_5$, the wedge angle α formed between the track grooves $3_5$ and $5_5$ of the outer joint member $2_5$ and the inner joint member $4_5$ switches in the order of the minus direction, the plus direction, and the minus direction from the inner-end side to the opening side, which is the same as that in the above-mentioned fixed type constant velocity universal joint $1_2$ according to the third embodiment. Thus, weight reduction and compactification can be achieved.

In this embodiment, the wedge angle α formed between the track grooves $3_5$ and $5_5$ of the outer joint member $2_5$ and the inner joint member $4_5$ switches in the order of the minus direction, the plus direction, and the minus direction from the inner-end side to the opening side, which is reverse to that in the above-mentioned fixed type constant velocity universal joints $1$, $1_1$ according to the first and second embodiments. Further, the reference operating angle, and the operating angles θ1 and θ2 at each of which the wedge angle α reaches 0° first are set to be low. Meanwhile, the wedge angle α varies in the use condition of a propeller shaft in the same way as that in each of the first and second embodiments, and hence description thereof is omitted.

Figures 21A, 21B:
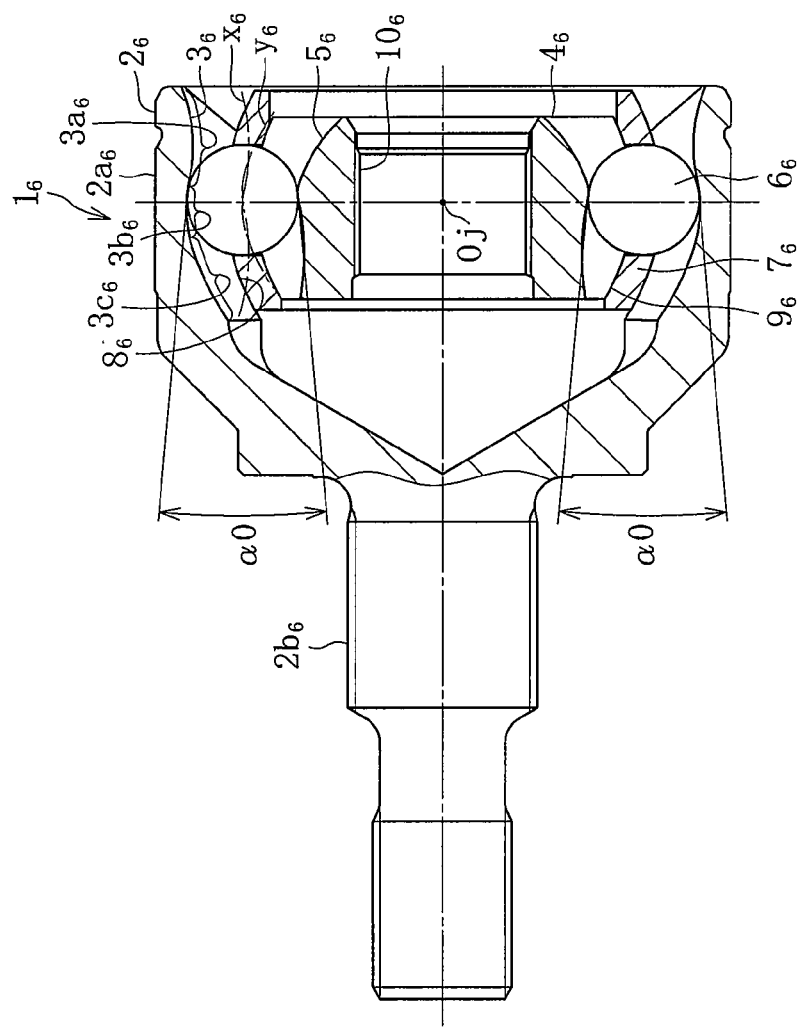
FIG. 21a A vertical sectional view of a fixed type constant velocity universal joint according to a seventh embodiment of the present invention.
FIG. 21b A front view of the fixed type constant velocity universal joint according to the seventh embodiment of the present invention.

FIGS. 21a and b illustrate a seventh embodiment of the present invention. FIG. 21a is a vertical sectional view of a fixed type constant velocity universal joint $1$ according to this embodiment, and FIG. 21b is a front view thereof. The fixed type constant velocity universal joint $1_6$ according to this embodiment is different from the fixed type constant velocity universal joint $1$ according to the first embodiment in number of the balls $6$, specifically, comprises six balls $6_6$. The parts having the same functions as those in the first embodiment are denoted by the same reference symbols except to the subscripts, and redundant description thereof is omitted. Also when the six balls are provided, the reference operating angle, the operating angles θ1 and θ2 at each of which the wedge angle α reaches 0° first, and how the wedge angle α varies are substantially the same as those in the first embodiment, and hence description thereof is omitted. The six balls are suitable to design for joints of small sizes.

Figure 22B:
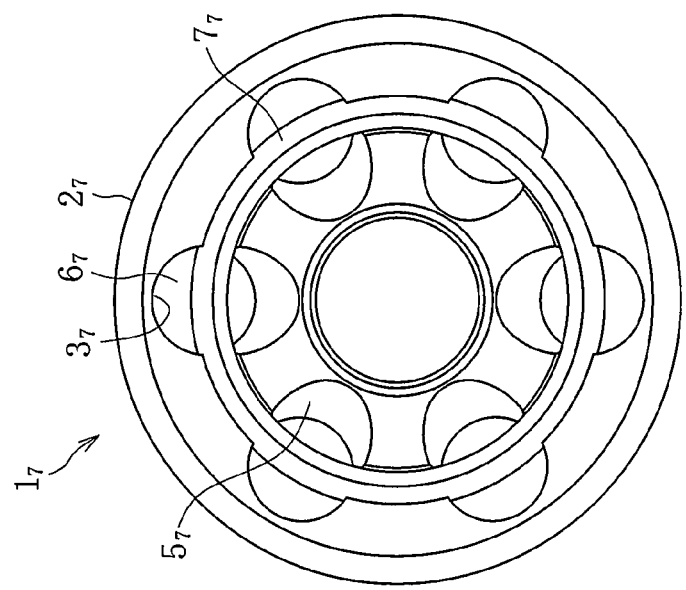
FIG. 22b A front view of the fixed type constant velocity universal joint according to the eighth embodiment of the present invention.
Figure 22A:
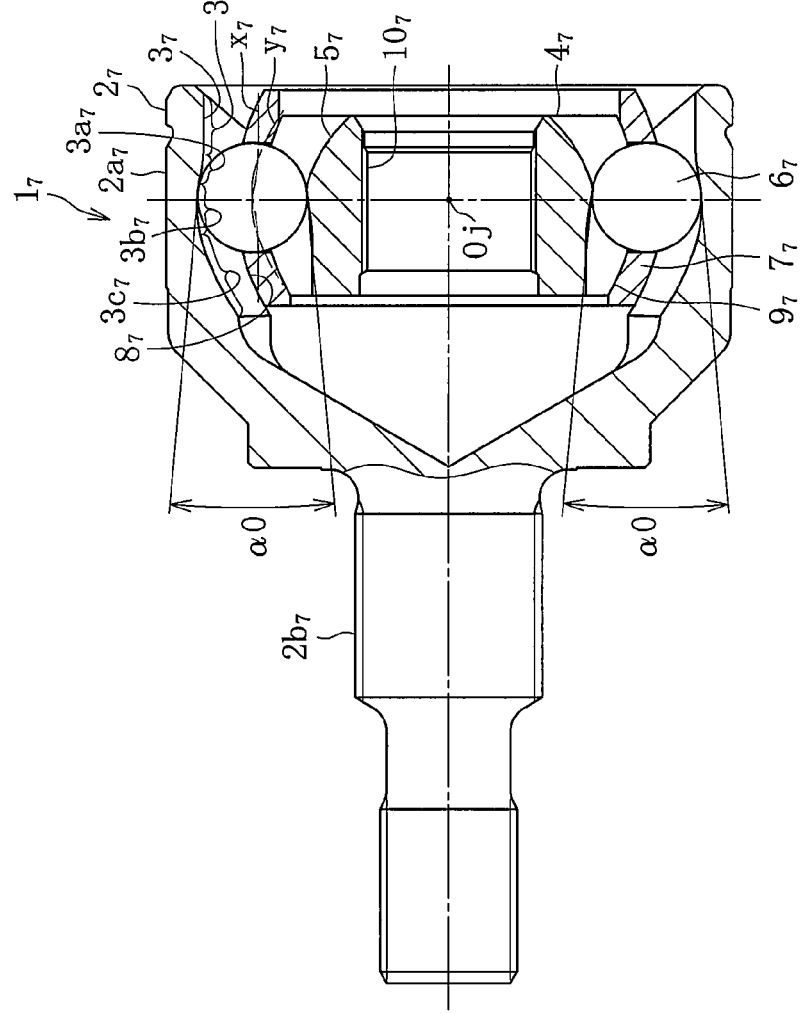
FIG. 22a A vertical sectional view of a fixed type constant velocity universal joint according to an eighth embodiment of the present invention.
Figure 23:
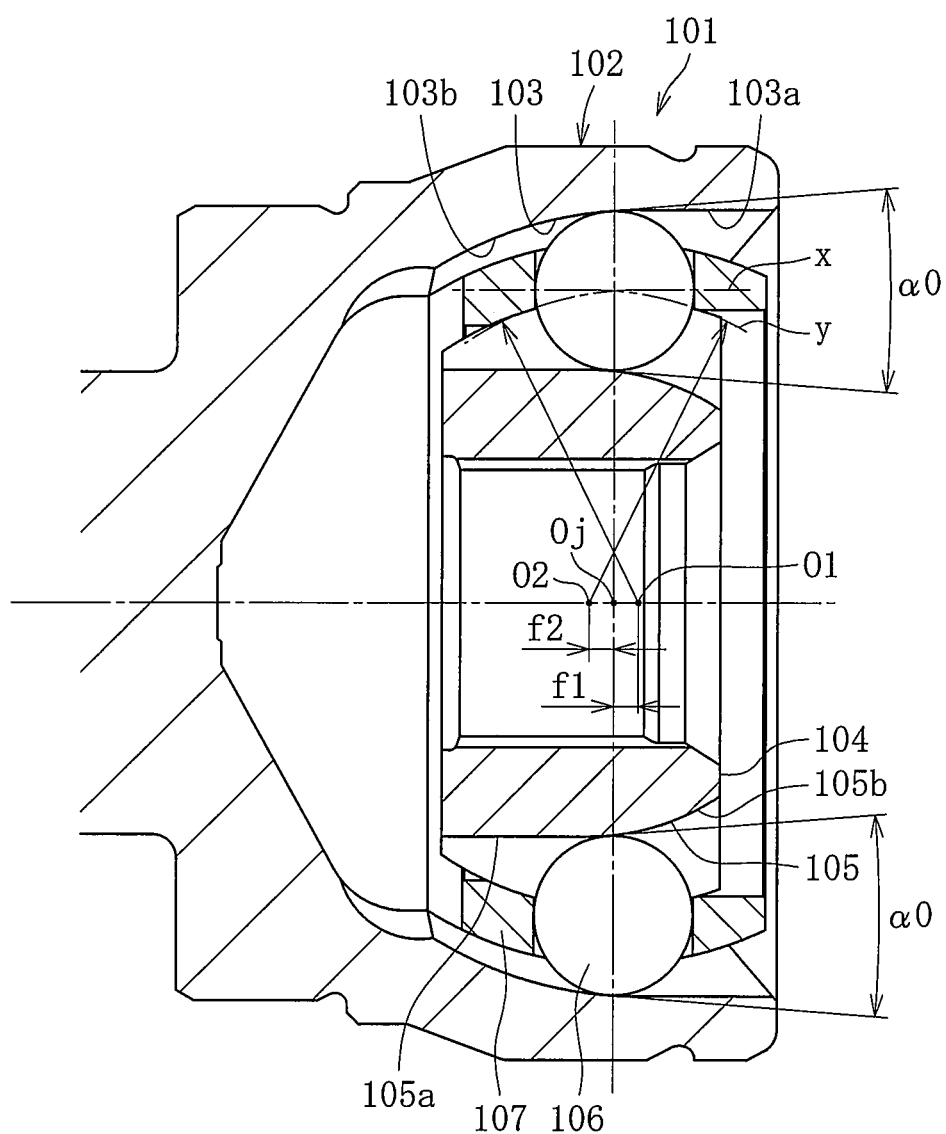
FIG. 23 A vertical sectional view of a conventional fixed type constant velocity universal joint.
Figure 24:
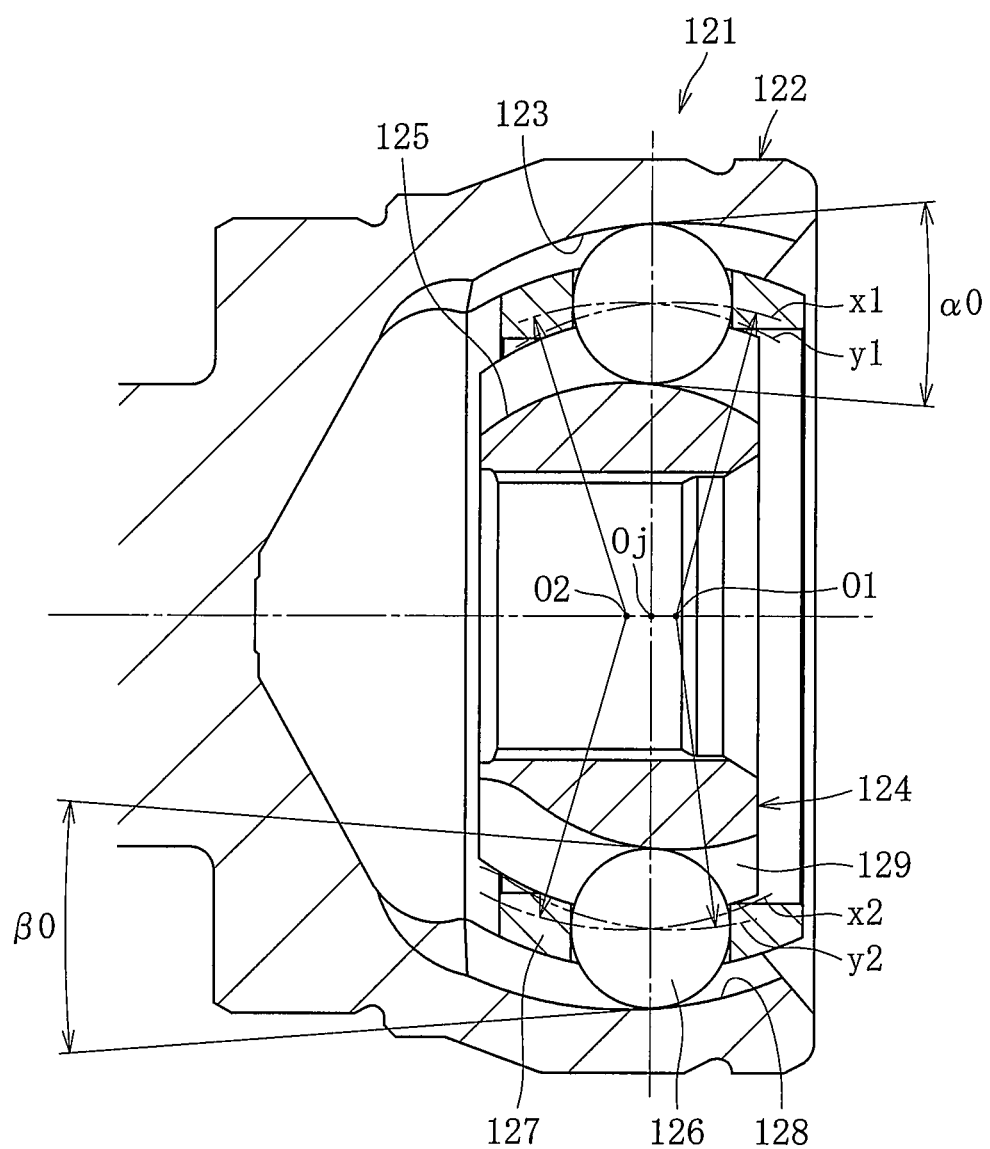
FIG. 24 A vertical sectional view of another conventional fixed type constant velocity universal joint.
Figure 25:
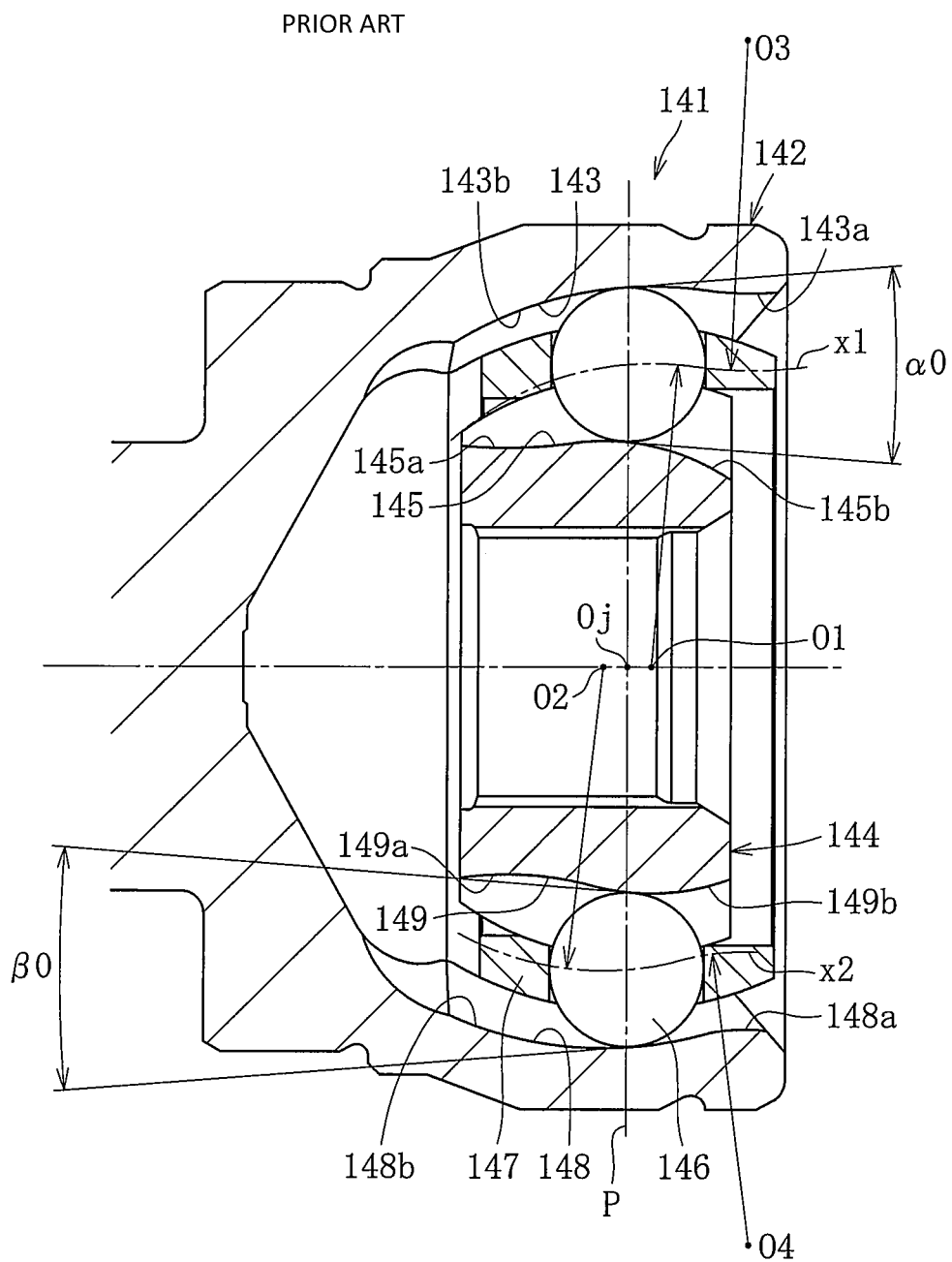
FIG. 25 A vertical sectional view of another conventional fixed type constant velocity universal joint.

FIGS. 22a and b illustrate an eighth embodiment of the present invention. FIG. 22a is a vertical sectional view of a fixed type constant velocity universal joint $1_7$ according to this embodiment, and FIG. 22b is a front view thereof. The fixed type constant velocity universal joint $1_7$ according to this embodiment is different from the fixed type constant velocity universal joint $1_3$ according to the fourth embodiment in number of the balls $6_3$, specifically, comprises six balls $6_7$. The parts having the same functions as those in the fourth embodiment are denoted by the same reference symbols except to the subscripts, and redundant description thereof is omitted. Similarly to the seventh embodiment, the six balls are suitable to design for joints of small sizes.

In the fixed type constant velocity universal joints according to the above-mentioned embodiments, the reference operating angle for drive shafts is set to 15°, but the reference operating angle may be set to an angle larger than 15°, or an angle smaller than 15°. Further, the reference operating angle for propeller shafts is set to 5°, but the reference operating angle may be set to different angles.

The ball-raceway center line of the outer joint member may extend in the manner that the wedge angle α switches in the order of the plus direction, the minus direction, and the plus direction from the inner-end side to the opening side, or may extend in the reverse order of the minus direction, the plus direction, and the minus direction. Further, the curvature centers and the curvature radii of the parts of the ball-raceway center line, which correspond respectively to the track groove portions, need not be set exactly as described above.

Further, the number of the balls is not particularly limited, but the six balls are suitable to design for joints of small sizes, and the eight balls are optimum to reduction of the torque loss. The number of the balls need not be set to six or eight, and may be set to three to five, seven, nine, or more.

The fixed type constant velocity universal joints according to the embodiments described above are each formed to be concentric by matching the curvature center of each of the spherical outer peripheral surface and the spherical inner peripheral surface of the cage with the joint center Oj. However, the curvature center of each of the spherical outer peripheral surface and the spherical inner peripheral surface of the cage may be slightly offset in the axial direction with respect to the joint center Oj.

REFERENCE SIGNS LIST 1 fixed type constant velocity universal joint
2 outer joint member
3 track groove
3a track groove portion on opening side
3b track groove portion in region comprising joint center plane
3c track groove portion on inner-end side
3s straight track groove portion
4 inner joint member
5 track groove
5a track groove portion on inner-end side
5b track groove portion in region comprising joint center plane
5c track groove portion on opening side
5s straight track groove portion
6 ball
7 cage
8 spherical inner peripheral surface
9 spherical outer peripheral surface
17 propeller shaft
20 drive shaft
A point at which wedge angle reaches 0°
B point at which wedge angle reaches 0°
C intersection
D intersection
f1 offset amount
f2 offset amount
f3 offset amount
f4 offset amount
f5 offset amount
f6 offset amount
O1 curvature center
O2 curvature center
O3 curvature center
O4 curvature center
O5 curvature center
O6 curvature center
Oj joint center
P joint center plane
R1 curvature radius
R2 curvature radius
R3 curvature radius
R4 curvature radius
R5 curvature radius
R6 curvature radius
x ball-raceway center line
y ball-raceway center line
α wedge angle
α0 wedge angle formed under state in which operating angle is 0°
θ1 operating angle at which wedge angle reaches 0°
θ2 operating angle at which wedge angle reaches 0°

The invention claimed is:

1. A fixed type constant velocity universal joint, comprising:
    an outer joint member having an inner spherical surface provided with a plurality of track grooves extending in an axial direction, and having an opening side and an inner-end side spaced apart from the opening side in the axial direction;
    an inner joint member having an outer spherical surface provided with a plurality of track grooves extending in the axial direction;
    torque transmitting balls each arranged between a respective pair of one of the plurality of track grooves of the outer joint member and one of the plurality of track grooves of the inner joint member; and
    a cage for holding the torque transmitting balls, the cage spherically fitting to both the inner spherical surface of the outer joint member and the outer spherical surface of the inner joint member,
    wherein, for each of the torque transmitting balls, a wedge angle is formed between a plane tangent to a portion of a corresponding one of the track grooves of the inner joint member at a position where a respective one of the torque transmitting balls is located on the corresponding one of the track grooves of the inner joint member and a plane tangent to a portion of a corresponding one of the track grooves of the outer joint member at a position where the respective one of the torque transmitting balls is located on the corresponding one of the track grooves of the outer joint member,
    wherein, when the fixed type constant velocity universal joint has an operating angle of 0°, a joint center plane of the fixed type constant velocity universal joint passes through a center of each of the torque transmitting balls, and the wedge angles of all of the torque transmitting balls open towards a same side of the fixed type constant velocity universal joint in the axial direction,
    wherein the one of the plurality of track grooves of the outer joint member and the one of the plurality of track grooves of the inner joint member of each respective pair have shapes that are mirror-image symmetrical with each other with respect to a joint center plane of the fixed type constant velocity universal joint,
    wherein the shapes, in the axial direction, of the one of the plurality of track grooves of the outer joint member and the one of the plurality of track grooves of the inner joint member of each respective pair are such that, for each of the torque transmitting balls, the wedge angle of a respective torque transmitting ball is 0° at an operating angle of the fixed type constant velocity universal joint where the respective torque transmitting ball is at a position toward the opening side of the outer joint member and at an operating angle of the fixed type constant velocity universal joint where the respective torque transmitting ball is at a position toward the inner-end side of the outer joint member, and
    wherein all of the plurality of track grooves of each of the outer joint member and the inner joint member have the same shape.

2. A fixed type constant velocity universal joint according to claim 1, wherein the operating angle at which the wedge angle is 0° where the respective torque transmitting ball is at the position toward the opening side and the operating angle at which the wedge angle is 0° where the respective torque transmitting ball is at the position toward the inner-end side are different from each other.

3. A fixed type constant velocity universal joint according to claim 2, wherein the plurality of track grooves of the outer joint member and the plurality of track grooves of the inner joint member each comprise two curves continuous with each other in the axial direction.

4. A fixed type constant velocity universal joint according to claim 2, wherein the plurality of track grooves of the outer joint member and the plurality of track grooves of the inner joint member each comprise three curves continuous with each other in the axial direction.

5. A fixed type constant velocity universal joint according to claim 2, wherein the plurality of track grooves of the outer joint member and the plurality of track grooves of the inner joint member each comprise two or three curves continuous with each other in the axial direction, each of the two or three curves being circular arc shaped.

6. A fixed type constant velocity universal joint according to claim 1, wherein the plurality of track grooves of the outer joint member and the plurality of track grooves of the inner joint member each comprise two curves continuous with each other in the axial direction.

7. A fixed type constant velocity universal joint according to claim 6, wherein the two curves continuous with each other in the axial direction of each of the plurality of track grooves of the outer joint member and the plurality of track grooves of the inner joint member are each circular arc shaped.

8. A fixed type constant velocity universal joint according to claim 1, wherein the plurality of track grooves of the outer joint member and the plurality of track grooves of the inner joint member each comprise three curves continuous with each other in the axial direction.

9. A fixed type constant velocity universal joint according to claim 8, wherein the three curves continuous with each other in the axial direction of each of the plurality of track grooves of the outer joint member and the plurality of track grooves of the inner joint member are each circular arc shaped.

10. A fixed type constant velocity universal joint according to claim 3, wherein the two curves continuous with each other in the axial direction of each of the plurality of track grooves of the outer joint member and the plurality of track grooves of the inner joint member are each circular arc shaped.

11. A fixed type constant velocity universal joint according to claim 1, wherein the plurality of track grooves of the outer joint member and the plurality of track grooves of the inner joint member each comprise two or three curves continuous with each other in the axial direction, each of the two or three curves being circular arc shaped.

12. A fixed type constant velocity universal joint according to claim 11,
    wherein the plurality of track grooves of the outer joint member and the plurality of track grooves of the inner joint member each comprise two curves continuous with each other in the axial direction,
    wherein each of the plurality of track grooves of the outer joint member has a ball-raceway center line that corresponds, from the inner-end side to the opening side, to a first track groove portion being circular arc shaped and having a first radius with respect to a first curvature center and a second track groove portion being circular arc shaped and having a second radius with respect to a second curvature center.

13. A fixed type constant velocity universal joint according to claim 11,
    wherein the plurality of track grooves of the outer joint member and the plurality of track grooves of the inner joint member each comprise three curves continuous with each other in the axial direction, and wherein each the plurality of track grooves of the outer joint member has a ball-raceway center line that corresponds, from the inner-end side to the opening side, to a first track groove portion being circular arc shaped and having a first radius with respect to a first curvature center, a second track groove portion being circular arc shaped and having a second radius with respect to a second curvature center, and a third track groove portion being circular arc shaped and having a third radius with respect to a third curvature center.

14. A fixed type constant velocity universal joint according to claim 4, wherein the three curves continuous with each other in the axial direction of each of the plurality of track grooves of the outer joint member and the plurality of track grooves of the inner joint member are each circular arc shaped.

15. A fixed type constant velocity universal joint according to claim 1, wherein each of the plurality of track grooves of the outer joint member includes a linear track groove portion formed at an opening side end portion and each of the plurality of track grooves of the inner joint member includes a linear track groove portion formed on an end portion at an inner-end side.

16. A fixed type constant velocity universal joint according to claim 1, wherein the operating angle at which the wedge angle is 0° where the respective torque transmitting ball is at the position toward the opening side or the operating angle at which the wedge angle is 0° where the respective torque transmitting ball is at the position toward the inner-end side is 15°.

17. A fixed type constant velocity universal joint according to claim 1, wherein the torque transmitting balls comprise six torque transmitting balls.

18. A fixed type constant velocity universal joint according to claim 1, wherein the torque transmitting balls comprise eight torque transmitting balls.

19. A drive shaft, comprising at least one fixed type constant velocity universal joint according to claim 1.

20. A propeller shaft, comprising at least one fixed type constant velocity universal joint according to claim 1.

* * * * *